(12) United States Patent
Makwinski et al.

(10) Patent No.: US 8,093,510 B2
(45) Date of Patent: *Jan. 10, 2012

(54) DOWNWARD FACING RECEPTACLE ASSEMBLY FOR CABLE RACEWAY

(75) Inventors: Mark Makwinski, Cromwell, CT (US); Richard R. Picard, West Harford, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/718,024

(22) Filed: Mar. 5, 2010

(65) Prior Publication Data

US 2010/0155133 A1 Jun. 24, 2010

Related U.S. Application Data

(63) Continuation of application No. 11/843,313, filed on Aug. 22, 2007, which is a continuation-in-part of application No. 11/035,477, filed on Jan. 13, 2005, now Pat. No. 7,262,371.

(51) Int. Cl.
*H02B 1/40* (2006.01)

(52) U.S. Cl. ...... 174/480; 174/481; 174/68.1; 174/68.3; 52/220.1; 52/220.7

(58) Field of Classification Search .................. 174/480, 174/481, 60, 67, 68.1, 72 A, 68.3, 95, 97, 174/96, 99 R, 135, 72 R; 220/3.2, 3.8, 3.5; 385/134, 135; 439/207, 209, 210–213; 52/220.1, 52/220.3, 220.5, 220.7, 220.8, 249
See application file for complete search history.

(56) References Cited

U.S. PATENT DOCUMENTS

| | | | |
|---|---|---|---|
| 5,998,732 A * | 12/1999 | Caveney et al. | 174/481 |
| 7,112,748 B2 * | 9/2006 | Hill | 174/480 |
| 7,193,159 B2 * | 3/2007 | Makwinski et al. | 174/480 |
| 7,388,163 B2 * | 6/2008 | VanderVelde et al. | 174/480 |
| 7,456,366 B2 * | 11/2008 | Makwinski et al. | 174/481 |
| 7,589,286 B2 * | 9/2009 | VanderVelde et al. | 174/480 |
| 7,741,568 B2 * | 6/2010 | Makwinski et al. | 174/480 |

* cited by examiner

*Primary Examiner* — Angel R Estrada
(74) *Attorney, Agent, or Firm* — McCormick, Paulding & Huber LLP

(57) ABSTRACT

A cable raceway system includes a device bracket and a device cover for outfitting an elongate cable raceway with a downward facing electrical device. The raceway, configured for attachment to a wall surface, is of the type having an interior wireway. The device bracket is cooperative with the raceway for access to the wireway, and includes a device support for connecting an electrical device to the bracket, in a downward facing orientation with respect to the raceway. More particularly, when an electrical device is attached to the device support, an access face of the electrical device is oriented generally perpendicularly with respect to the wall surface. The cover cooperates with the bracket and raceway for covering the bracket, and has a faceplate portion complementary to the electrical device.

20 Claims, 30 Drawing Sheets

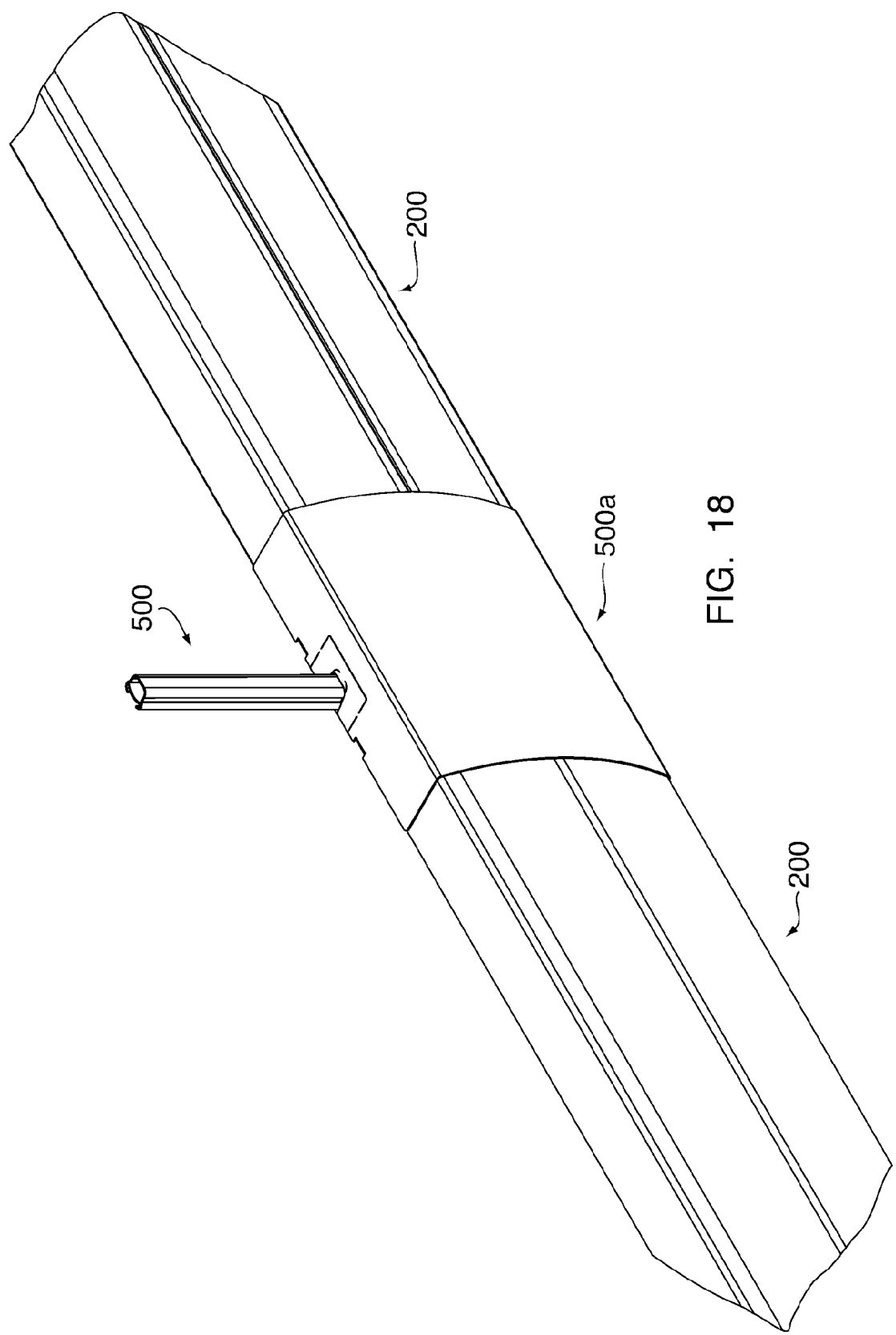

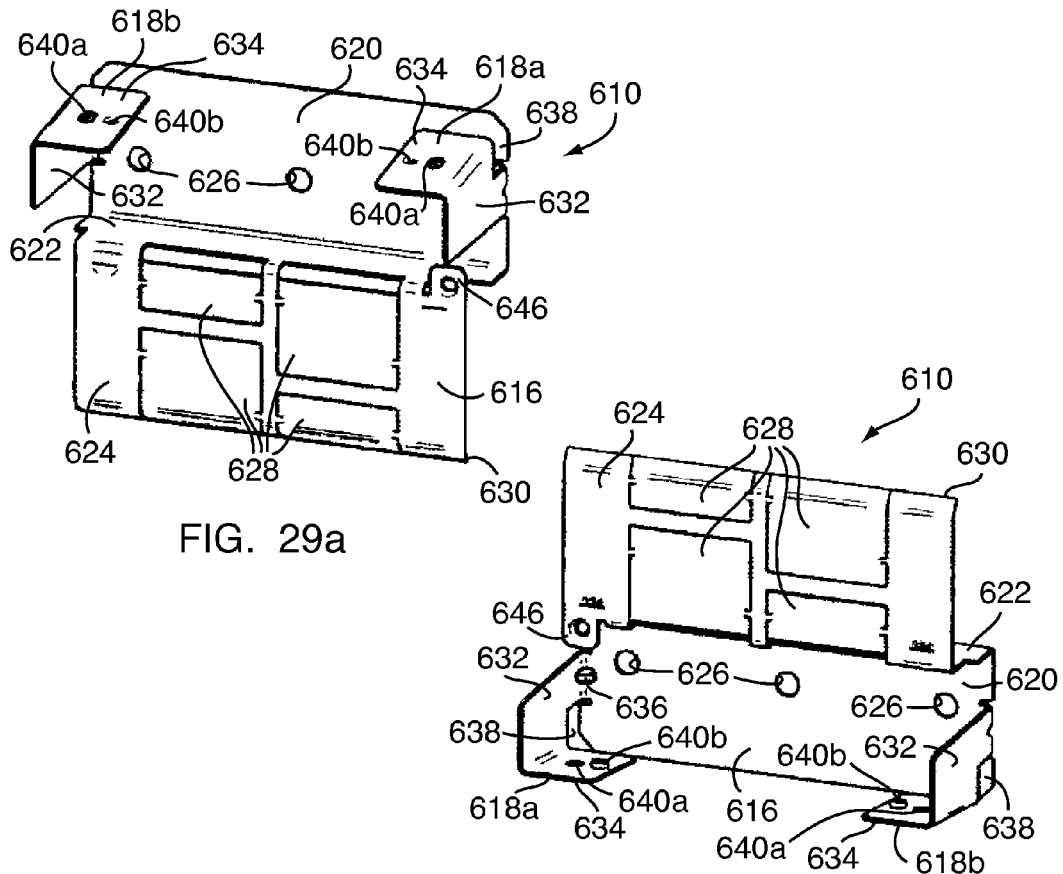
FIG. 29a
FIG. 29b
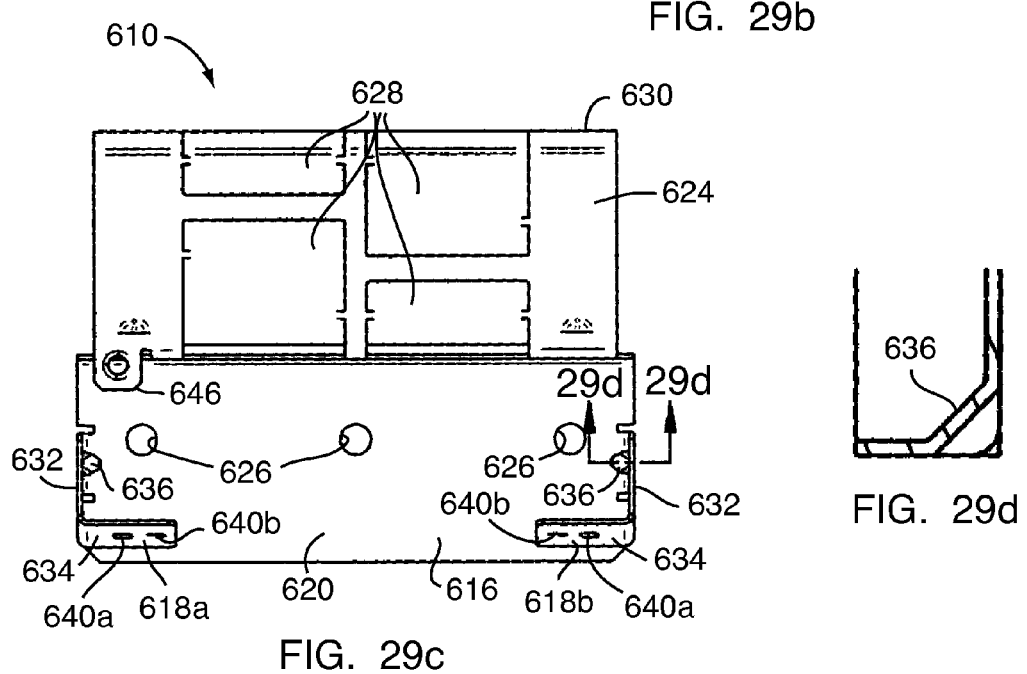
FIG. 29c
FIG. 29d

DOWNWARD FACING RECEPTACLE ASSEMBLY FOR CABLE RACEWAY

CROSS REFERENCE TO RELATED APPLICATION

This application is a continuation of U.S. patent application Ser. No. 11/843,313, filed Aug. 22, 2007, which is a continuation-in-part of prior U.S. patent application Ser. No. 11/035,477, filed Jan. 13, 2005 (now issued U.S. Pat. No. 7,262,371 B2), both of which are hereby incorporated by reference herein in their entirety.

FIELD OF THE INVENTION

The present invention relates to conduit or raceways for electrical cabling.

BACKGROUND OF THE INVENTION

In certain types of building construction, e.g., retrofits, cinder block, or the like, it may not be possible or practicable to run electrical cabling (such as high voltage power lines and low voltage data lines) through the building's walls. In such cases, modular raceway or conduit assemblies are often used to house and route cabling along a wall or other surface. A typical raceway assembly includes a linear or elongate housing having at least one interior passageway that accommodates a length of electrical cabling. (Such a passageway is referred to herein as a "wireway.") The housing is attached to a wall, and then the cabling is disposed in the interior of the housing. To cover a given span, multiple segments of housing are deployed in an end-on-end manner.

Besides delivering electricity from a source to an endpoint, outlet or receptacle devices may be deployed at various points along the length of the raceway for accessing the cables in the raceway. For example, data ports may be provided for accessing a data line, and electrical receptacles (connected to a high voltage line in the raceway) may be provided as a power source for electrical devices. For installing an outlet or receptacle, an outlet box is surface mounted to a wall between adjacent segments of conduit or raceway. The receptacle is then electrically connected to the endpoints of the electrical lines in the raceway, and mechanically connected to the outlet box, including possible provision of a finishing cover plate. (The receptacle may also be electrically connected to the outlet box, such as a ground connection.) Alternatively, instead of using separate outlet boxes, certain raceway configurations allow receptacle or outlet devices to be attached directly to the front wall or cover of the raceway. Although in both cases such configurations are functional in terms of allowing general user access to a raceway's interior electrical cabling, a series of front-facing receptacles is not aesthetically pleasing in most settings. Additionally, since the receptacles themselves are exposed in a forward facing manner, there is a greater chance of environmental contamination, such as from splashing liquids.

SUMMARY OF THE INVENTION

An embodiment of the present invention relates to a cable raceway system, e.g., an assembly for outfitting a raceway with a downward facing receptacle, outlet, or other electrical device. The system includes (or is meant for use with) an elongate cable raceway of the type having an interior wireway, which is mounted to a wall surface. The system also includes a device bracket cooperative with the raceway for access to the interior wireway, which is to say that the device bracket facilitates passage of an electrical cable from the wireway to an electrical device attached to the device bracket. (By "electrical device," it is meant a device that runs on electricity provided by the electrical cable, such as a light, or a device that allows general user access to the electrical cable, such as a receptacle, outlet, or data port, but not to electrical cabling generally.) The device bracket includes a device support for connecting an electrical device to the bracket, in a downward facing orientation with respect to the raceway. More particularly, when an electrical device is attached to the device support, an access face of the electrical device is oriented generally perpendicularly with respect to the wall surface, e.g., at an angle of between about 95 degrees and about 75 degrees. ("Access face" refers to the portion of an electrical device that is meant for general user access or benefit, such as the finished, female electrical connection of a data port or electrical outlet, a light emitting device/cover, or the like.) The system also includes a device cover cooperative with the bracket and raceway for covering the bracket. The cover has a faceplate portion complementary to the electrical device, e.g., one or more access apertures for exposing the access face.

As should be appreciated, the system of the present invention allows cable raceways to be outfitted with downward facing outlets or other electrical devices, e.g., when the raceway is attached horizontally to a wall surface, the electrical devices, being generally perpendicular to the wall surface, face downwards. Because the electrical devices face downwards, they are not directly visible to casual observers, thereby improving the overall appearance of the raceway. Moreover, the downward facing electrical devices are less prone to environmental contamination.

In another embodiment, the system is configured for use with low profile-type, rectangular cable raceways. Here, the device bracket is generally step-shaped, and includes a wall-mount portion and a raceway access portion. The wall-mount portion abuts the wall surface below the raceway, for attaching the device bracket to the wall. The raceway access portion extends upwards to cover the front portion of the cable raceway, and includes one or more knock-outs or other access gateways for selective access to the interior wireway of the cable raceway. (For example, a portion of the raceway cover is typically removed, with the raceway access portion of the device bracket in effect replacing that portion of the raceway cover.) The electrical device is attached to the device bracket in a crosswise manner below the raceway. Again, the electrical device's access face lies generally perpendicular to the wall surface, thereby facing downwards with respect to the raceway. The device cover fits over the bracket, extending from the top of the bracket, outward from the raceway, to down below the raceway, for covering the electrical device.

In another embodiment, the cable raceway has an elongate, T-shaped base and upper and lower L-shaped covers. The covers engage the base for defining upper and lower wireways. The device bracket is generally U-shaped, and engages the raceway base in the lower wireway. The lower leg of the U-shaped device bracket, generally aligned with the bottom wall of the lower L-shaped cover, is provided with the device support for attachment of an electrical device. When attached to the device support, the electrical device faces downwards with respect to the raceway (assuming the raceway is horizontally oriented).

BRIEF DESCRIPTION OF THE DRAWINGS

FIG. 3 also illustrates in exploded relationship the geometry of device brackets and device bracket "covers" such as are suitable for use in a raceway of the type disclosed herein.

FIG. 17 is a vertical section through an assembled base 220 and cover pair 260 and 280, with a pair of raceway couplers 250, 250 snapped into the raceway base for holding adjacent base members in alignment. Note the openings 250a, 250a for receiving screw fasteners S, S. Covers 260 and 280 cooperate with the T-shaped base 220 to define separate wireways for the power and data/communication cables.

FIG. 17a shows a preferred one-piece raceway base construction 220a.

FIG. 18 is a perspective view of two aligned raceway sections 200, 200 that are joined by a transition fitting, and bridging or linking one wireway with another raceway of smaller capacity.

FIGS. 29a-29g are various views of a bracket portion of the assembly shown in FIGS. 28a and 28b, wherein: FIGS. 29a and 29b are perspective views; FIG. 29c is a front side elevation view; FIG. 29d is a detail cross section view taken along lines 29d-29d in FIG. 29c; FIG. 29e is a right side elevation view; FIG. 29f is a bottom view taken along line 29f-29f in FIG. 29e; and FIG. 29g is a front side elevation view showing an outlet device attached to the bracket.

FIGS. 30a-30i are various views of a cover portion of the assembly shown in FIGS. 28a and 28b, wherein: FIGS. 30a and 30b are perspective views; FIG. 30c is a right side elevation view; FIGS. 30d and 30e are detail views taken at 30d and 30e in FIG. 30c, respectively; FIG. 30f is a bottom view taken along line 30*f*-30*f* in FIG. 30*c*; FIG. 30*g* is a top plan view; FIG. 30*h* is a front side elevation view; and FIG. 30*i* is a cross section view taken along line 30*i*-30*i* in FIG. 30*h*.

DETAILED DESCRIPTION

Turning now to the drawings in greater detail, a wall structure is indicated generally at W1 and W2, defining an internal corner as shown, to represent the environment where a raceway of the present invention can be provided. See, for example, FIGS. 5 and 6, where both internal and external corners are illustrated, and where dropdown raceway segments are provided for bringing electrical cables to the raceway.

Figure 1:
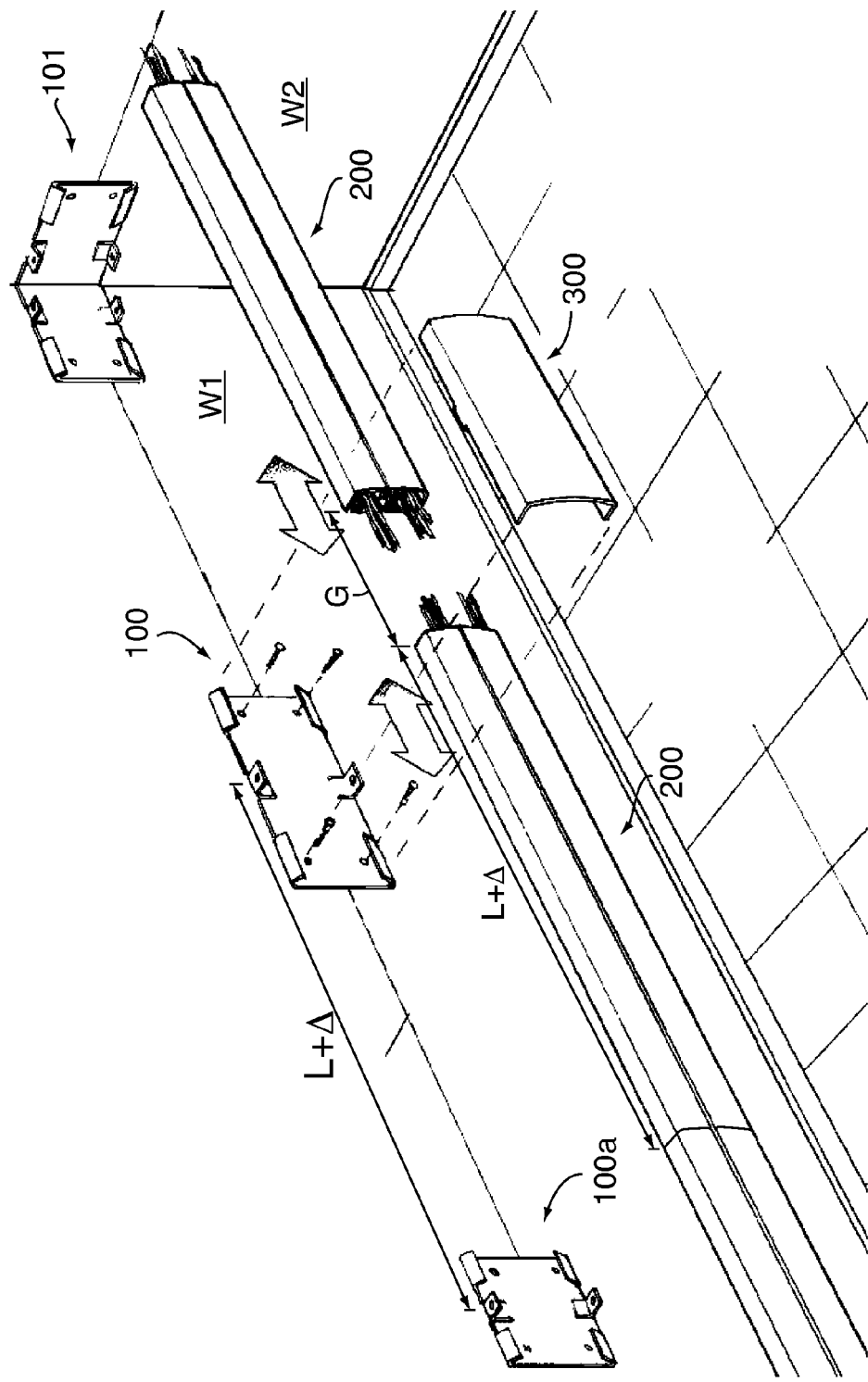
FIG. 1 is an exploded perspective view showing the various components of a first embodiment of the present invention relative to a wall structure.

With reference to FIG. 1, in accordance with the first embodiment of the present invention, a modular raceway is provided, and includes standard-length raceway sections of length "L" that can be secured to the walls W1 or W2, by wall brackets as indicated at 100, 100*a*. Corner brackets can be fabricated from these unique wall brackets 100, as indicated at 101. Thus, the corner bracket 101 may comprise individual brackets fabricated from the wall brackets 100, 100*a*, to form a corner bracket 101. It will also be apparent that this same approach can be used to form a corner bracket that can be utilized at an external corner.

Figure 3:
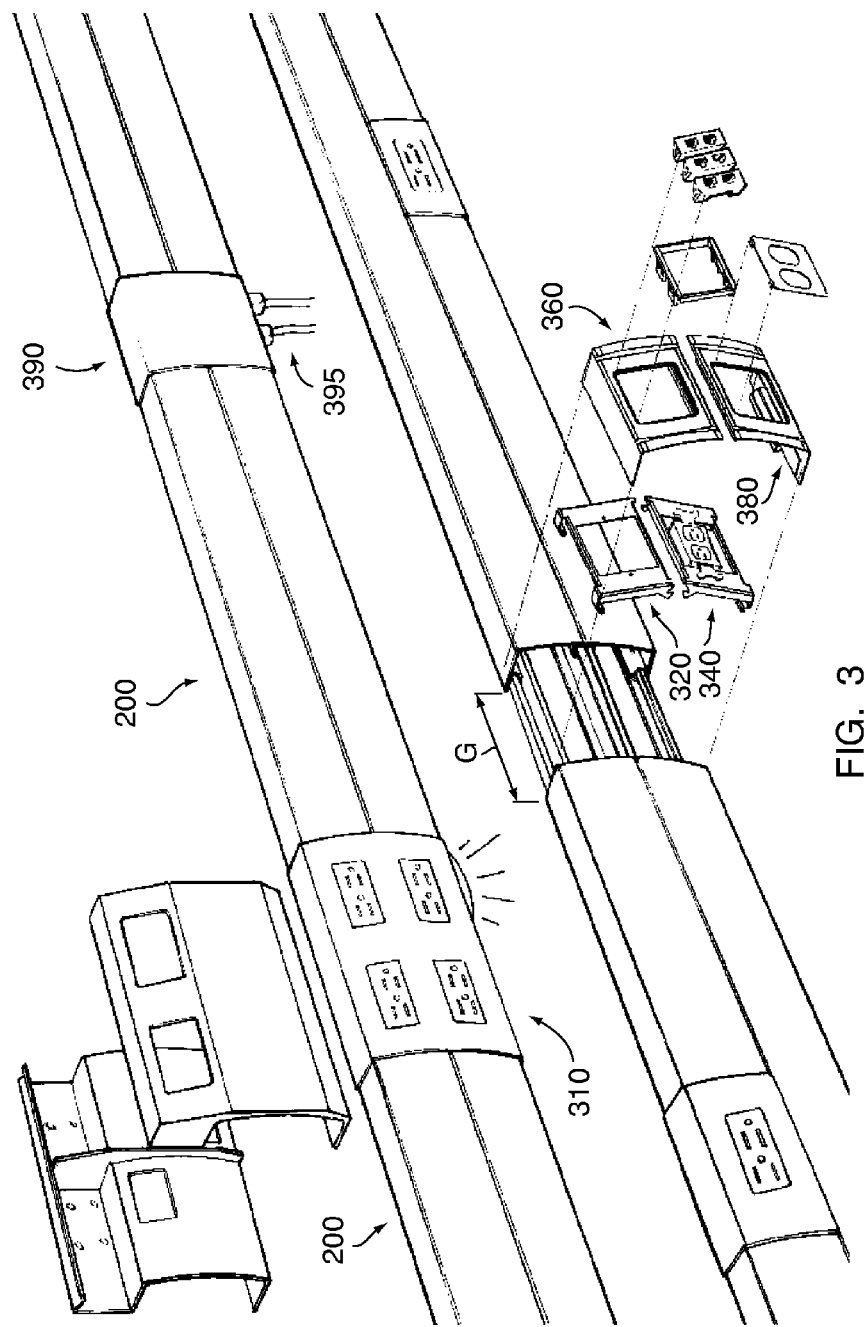
FIG. 3 illustrates the raceway components of the present invention taking advantage of the downwardly open receptacles in the lower raceway, as well as the staggered mounting for outlet devices in the upper and lower raceway covers. Also shown in FIG. 3 is an alternative arrangement where the outlet devices are clustered at a single location in the raceway. This alternative embodiment illustrates a raised device box to provide additional through-put for the cabling in the wireways defined by the raceway base and cover in accordance with the present invention.
Figure 5:
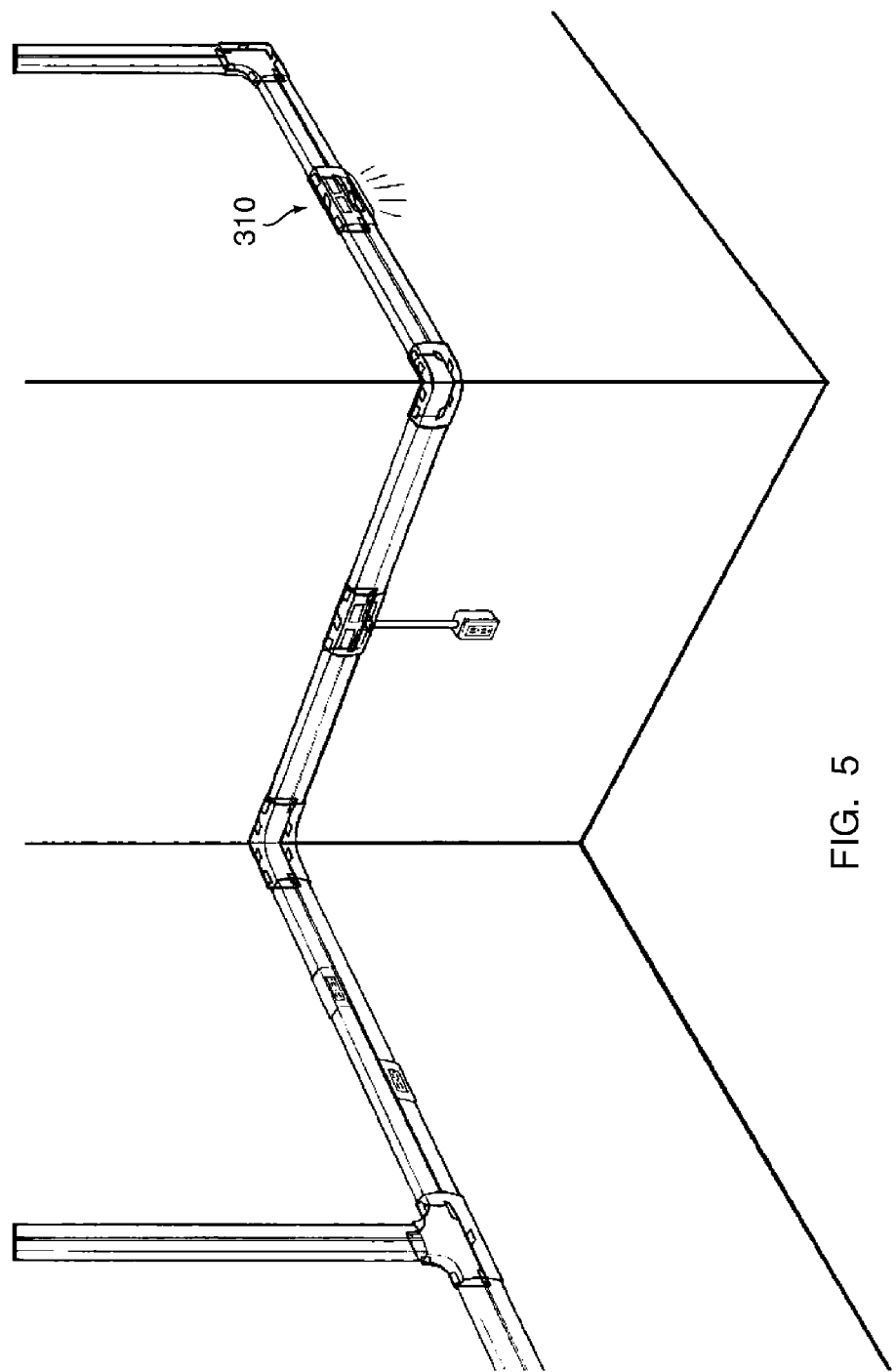
FIG. 5 is an assembly view illustrating the use of modular raceway in accordance with the present invention in a particular installation and illustrates the various internal and external elbows, T-shapes, and flat elbow configurations necessary to provide a complete installation in a particular building environment.
Figure 6:
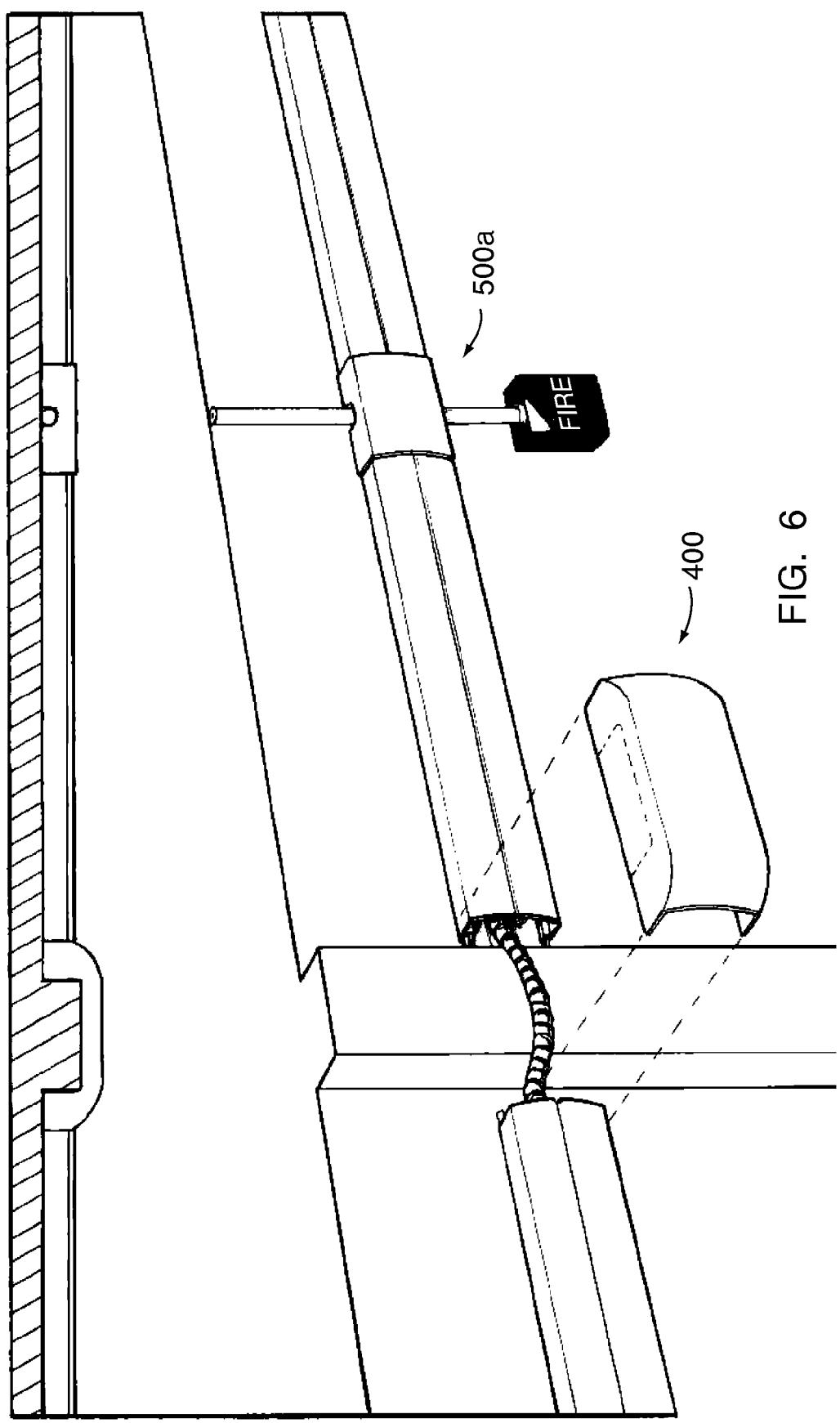
FIG. 6 shows another alternative installation for running raceway of the present invention around an obstacle or column, and/or around an existing conduit or other smaller obstacle in the path of the raceway.

A feature of the present invention is that the raceway assemblies 200, 200 are of standard length (L), preferably between 4-8 feet, and are pre-wired. Thus, the raceway assemblies 200 can be assembled with the mounting brackets 100, 100*a* so as to leave a gap "G" between the end portions thereof. The internal wiring for each raceway assembly can be filled with connectors (not shown) or conventionally connected by twist-on wire connectors or the equivalent. The gap G can be closed by a short raceway slip cover member 300, which is of U-shape, and has an internal contour to fit over the external contour of the raceway covers in the assemblies 200, 200, and to overlap these assemblies as shown in FIG. 3 for example. Alternatively, the gap G in the raceway assemblies 200, 200 can be used to provide an obstacle clearance component such as shown at 400 and 500 in FIG. 6. More generally, this gap G can be utilized to accommodate T-fittings, outlet device brackets and slips covers, internal and external elbows, and flat elbows, all as shown in FIG. 5.

Figure 7:
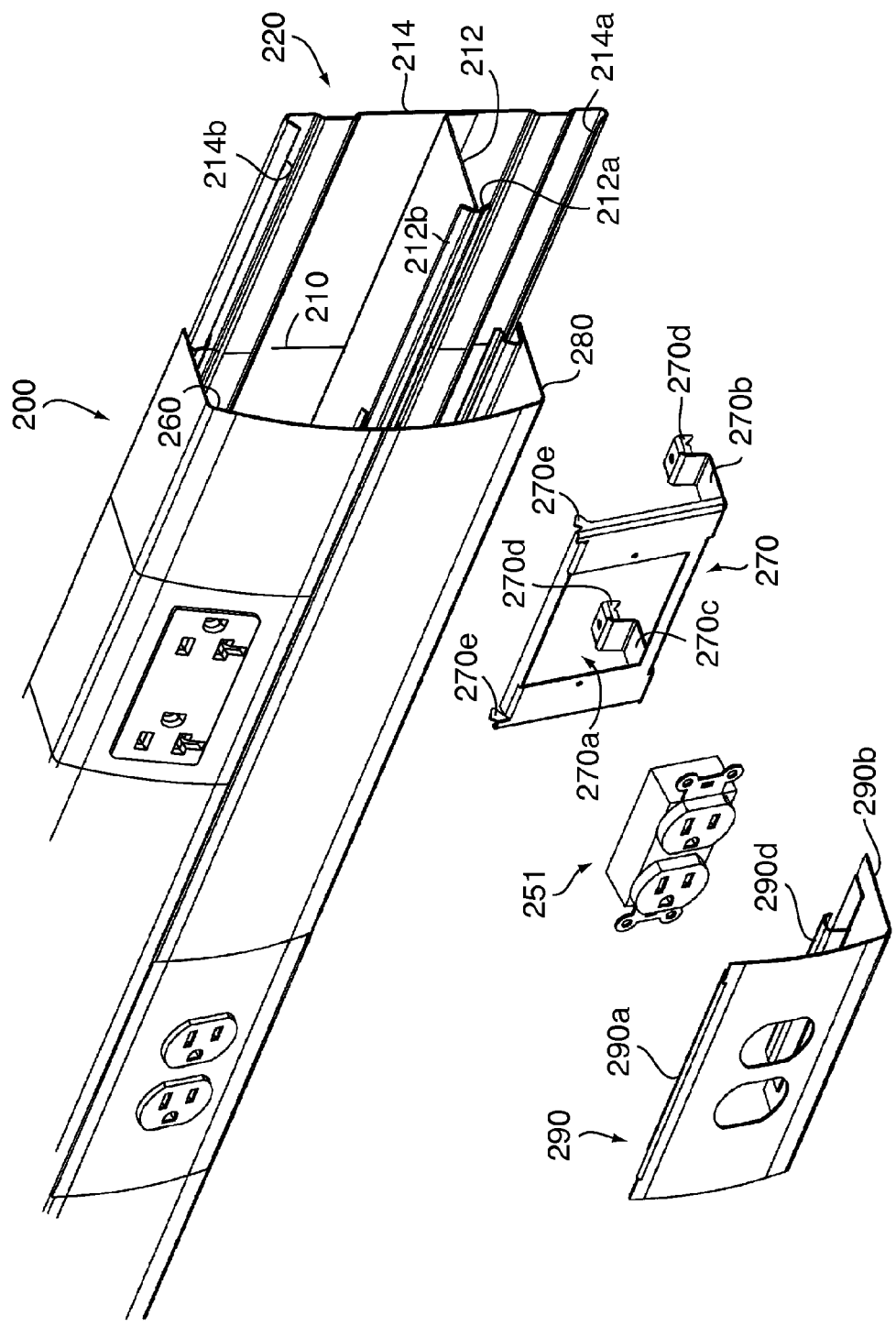
FIG. 7 shows in exploded relationship the various components required to install outlet device brackets in the lower wireway of a raceway in accordance with the present invention.

The raceway assemblies 200, 200 comprise a T-shaped base component such as shown at 220 in FIG. 7, plus two raceway cover components 260 and 280, each being of L-shape and snapped into the base 220 as suggested in FIG. 7. This configuration allows outlet devices to be placed at any location in the raceway assembly, and in either one or both of the upper and lower covers. FIG. 7 shows one outlet device for assembly in the front wall of the lower wireway between spaced apart raceway cover components (one shown at 280).

Figure 2:
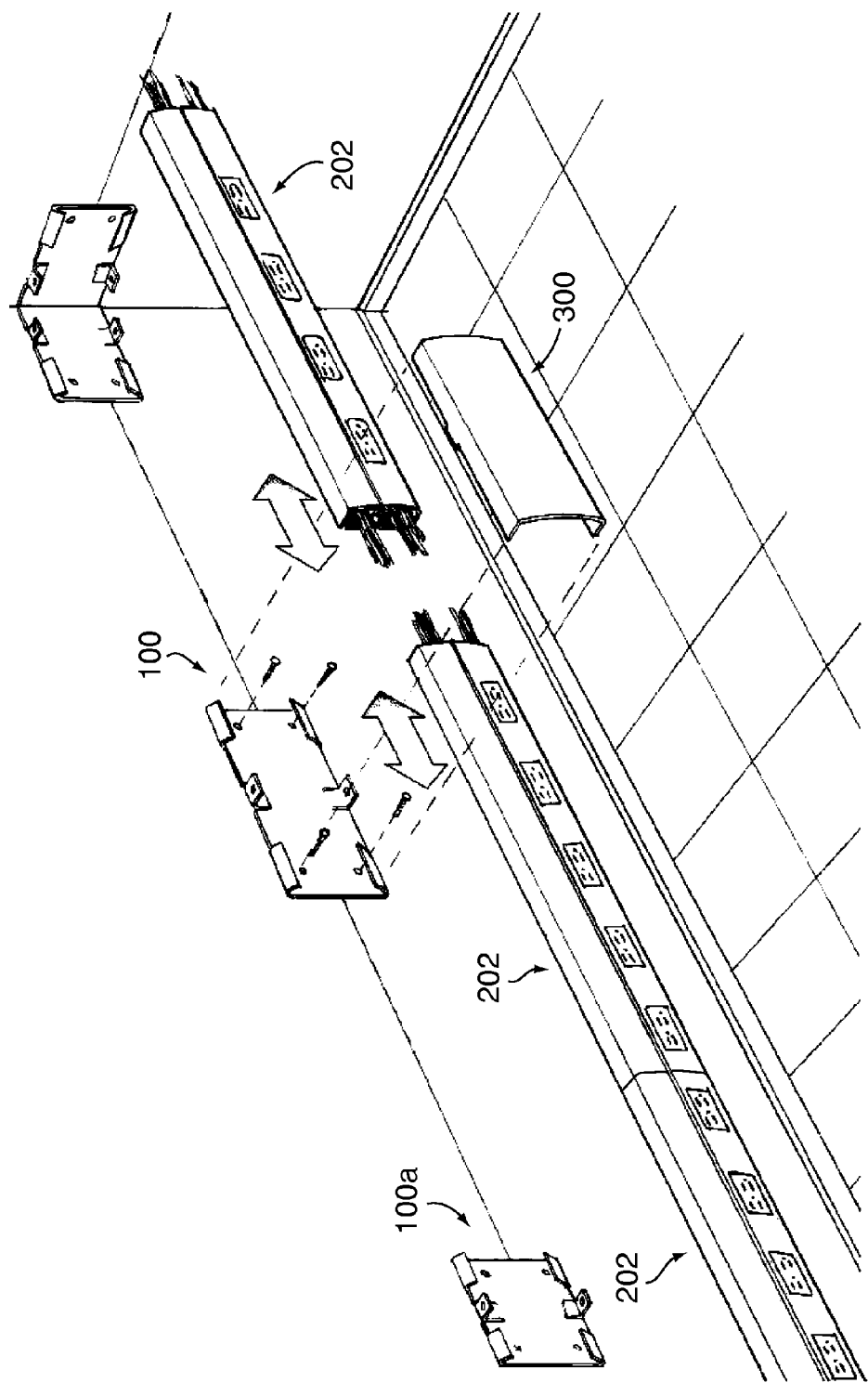
FIG. 2 is an exploded view of the components of the present invention as adapted for use in a modular raceway system that not only includes preassembled cables in the various raceway sections, but also including pre-wired electrical outlet devices in the lower raceway.
Figure 24:
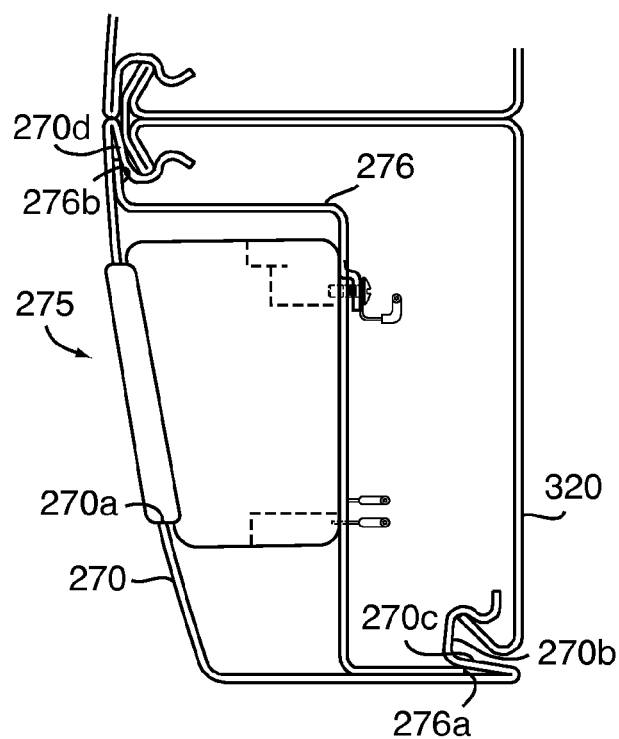
FIGS. 24-26 show a raceway cover component, such as described above, having an L-shape and mounted on a raceway base to and from a wireway. The cover has cutouts to receive additional plugs similar to those sold by The Wiremold Company.
Figure 25:
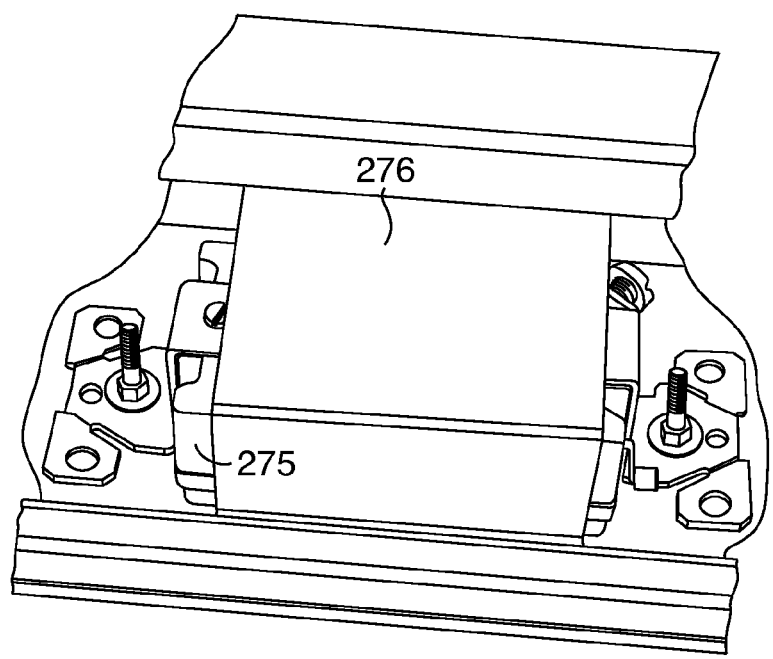
Figure 26:
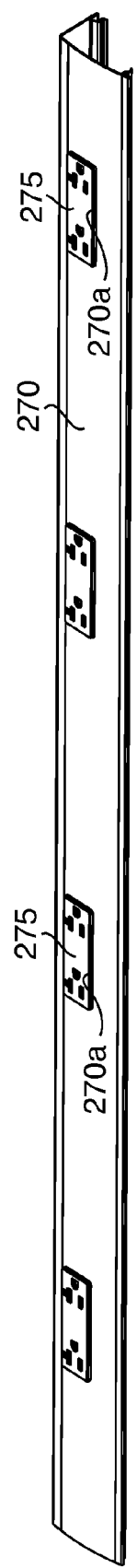

FIG. 2 shows the same components as depicted in FIG. 1 except that the raceway assemblies 202 are not only pre-wired, but are also fitted with pre-wired outlet devices. Pre-wired raceway of this type is available, but not in with an L-shaped cover used with a T-shaped raceway base to achieve the results set forth herein. FIGS. 24-26 show this assembly in greater detail and will be described in greater detail below.

Turning next to a detailed description of FIG. 3, various configurations for mounting outlet devices are illustrated for use with a raceway assembly constructed in accordance with the present invention. For example, in the gap G between adjacent raceway assemblies 200, 200, an assembly similar to that shown at 310 in FIG. 5 can be installed providing a multitude of outlet devices, including a "down light." As a result of the unique L-shaped configuration for the raceway covers, it is possible to provide outlets in the downwardly facing side wall of the lower raceway cover.

Individual device brackets for both the upper and lower wireways defined in the raceway of the present invention are indicated generally at 320 and 340 in FIG. 3, each being designed to accommodate a device such as an outlet plug. A cover or half cover is provided for each of these device brackets, and the upper cover may include a frame to accommodate data ports while the lower half cover may include a snap-in outlet device plate, or the outlet device plate can be provided in one piece with the half cover as described hereafter.

Still with reference to FIG. 3, and in locations where the adjacent raceway assembly end portions abut, so as to provide a continuous back plane for the raceway in a manner to be described, a somewhat shorter raceway coupling slip cover 390 can be fitted as shown. Furthermore, the opportunity for providing downwardly facing outlet devices permits power cabling such as indicated at 395 to be hidden from view and to be protected from the environment. This location for outlet plugs provides power leads 395 in a protected area below the raceway, and between the raceway and the floor.

Figure 4:
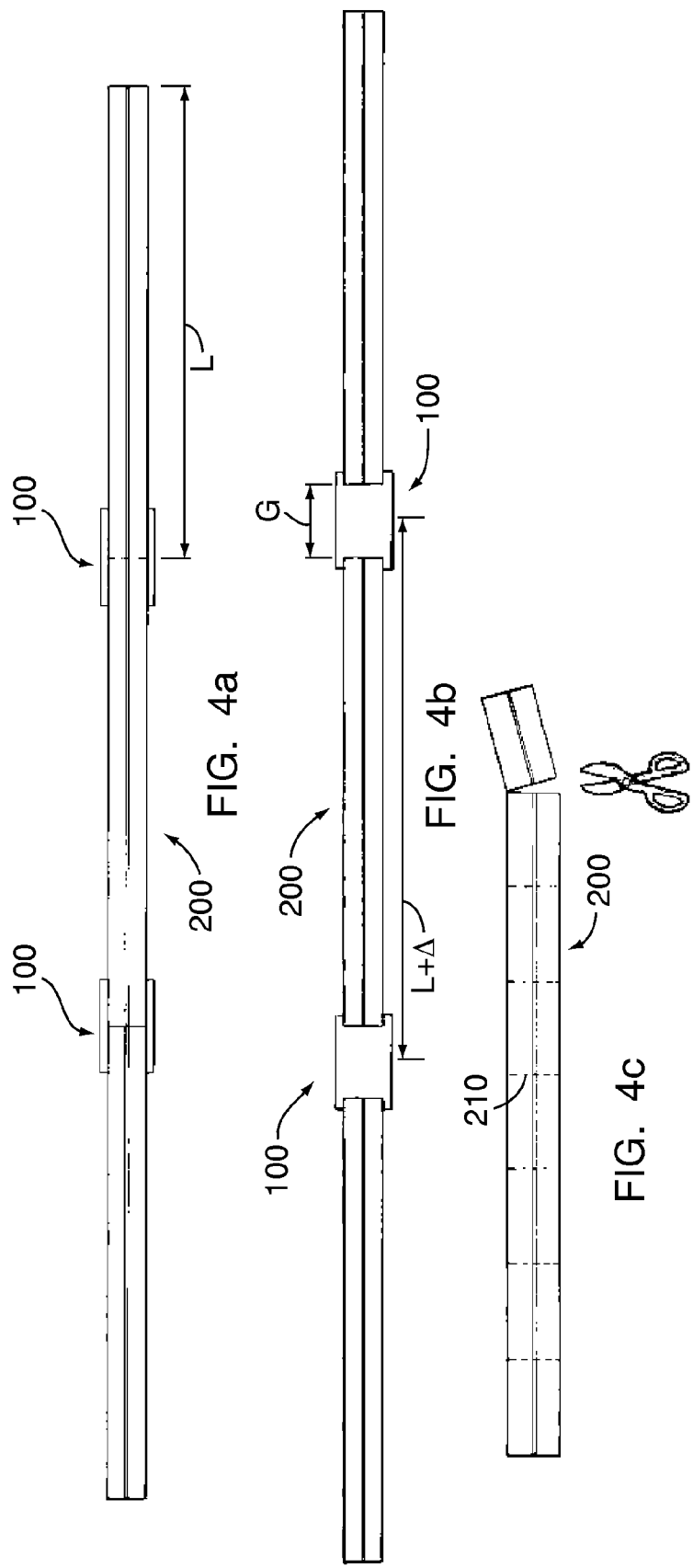
FIGS. 4a-4c show in several schematic views the advantage to providing predetermined length raceway base sections together with brackets for supporting these raceway base sections, to mount on a wall structure of varying length, yet with the same raceway components. These figures also illustrate the lines of weakening provided in the raceway base to achieve somewhat shorter raceway sections for wall lengths that require less than these "minimum length" raceway sections.

FIGS. 4*a*-4*c* illustrate the flexibility of raceway assemblies constructed in accordance with the present invention, and show in somewhat schematic fashion the support brackets 100 together with aligned raceway assemblies 200, 200. In FIG. 4*a*, the raceway assemblies 200, 200 are shown in an abutting relationship. In FIG. 4*b*, the raceway assemblies 200, 200 are shown in a spread relationship so as to provide a gap "G" between the end portions of the adjacent aligned raceway assemblies 200. FIG. 4*c* illustrates a feature of the raceway base of the present invention whereby lines of weakening 210, 210 are provided incrementally along the length L of the raceway base. As a result of this configuration three standard length (L) raceway segments 200, 200, each eight feet in length for example, can be used to accommodate either a 24 foot span of wall, or can be expanded to provide an extra one foot four inches along the wall as a result of the gaps G provided between each of the raceway assemblies. The scoring of the eight-foot raceway sections in predetermined increments allows even more variation in the overall raceway length that can be accommodated with a minimum of installation effort.

Figure 16:
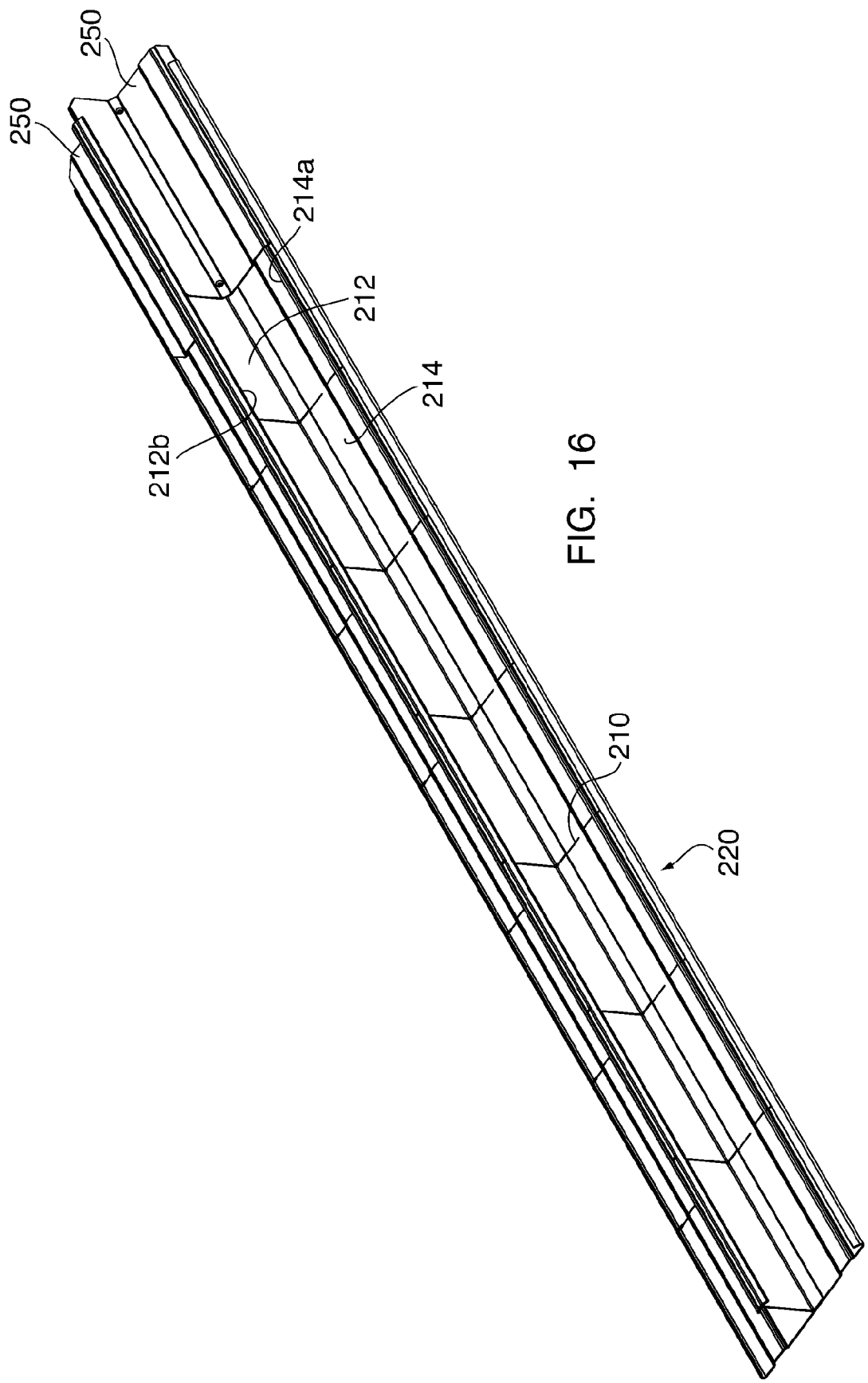
FIG. 16 shows a T-shaped raceway base 220 having an integrally formed divider, and the same lines of weakening provided at predetermined intervals. Raceway covers 260 and 280 (see FIG. 17) can be shaped into assembly with the base as described above. To join aligned raceway base components to one another at installation, couplers 250, 250 are shaped into the wireway defining walls of the T-shaped base.
Figure 16A:
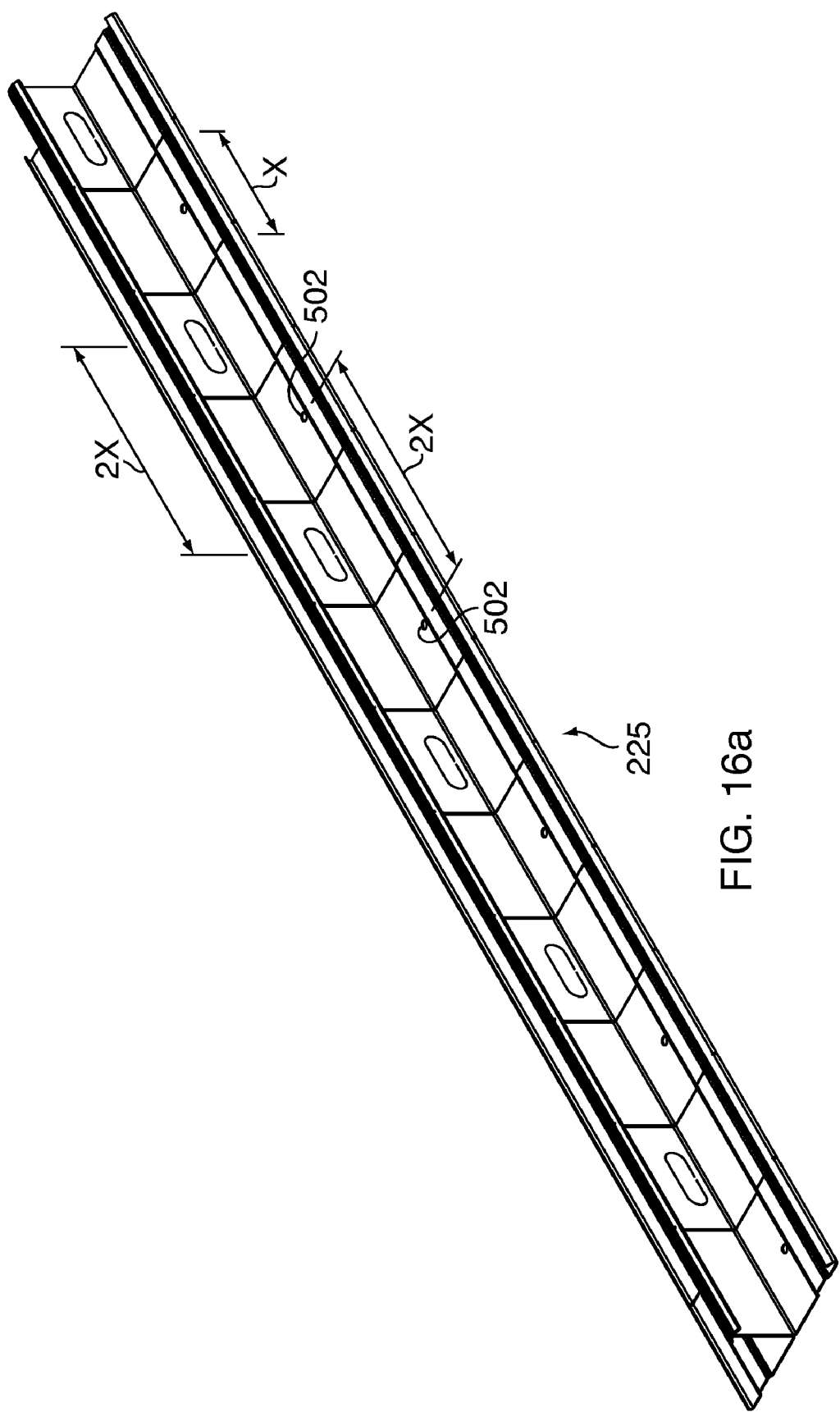
FIG. 16a shows a T-shaped base 225 having spaced lines of weakening, and alternately arranged knock-out openings in the web, and in the base for mounting to a wall structure. The knock-out openings provide access for wiring between wireways.

In a preferred embodiment, to be described with reference to FIG. 16*a*, these lines of weakening are only 4 inches apart, as shown at "X." A more convenient fit to the convention stud spacing (16 inches or 24 inches) in conventional wall structures can be achieved with the pre-punched base plate mounting holes 502, 502 spaced 2 inches from every other line of weakening (e.g., spaced "X/2"), providing a spacing between mounting holes of "2X." The same spacing "2X" is provided between the knock-out openings in the web portion of the T-shaped base as shown in FIG. 16*a*. Finally, the slip covers, 300 for example, are preferably half again as long as the spacing X, or 1.5 times X of the lines of weakening 210, 210 in the preferred embodiment (e.g., 6 inches for the preferred 4 inches spacing).

It is noted here that installers of present day raceway must use precision cutting tools that are designed to sever a rather heavy gage steel raceway base, that is generally of U-shape. Often times the cut is not square, or otherwise of sufficient precision to satisfy either UL requirements, or the installer/customer's needs.

Although present day covers for use with conventional U-shaped raceway base configurations can be conveniently cut because they are flat, the flanges on the back side of the these covers can lead the installer to uneven cuts, resulting in an imperfect raceway installation. Even the untrained eye can be expected to pickup defects such as these. The present invention effectively obviates or at least minimizes the opportunity for such imperfections.

The purpose then of the present invention is to provide a unique raceway system that is not only of modular construction as mentioned above, but that also includes a raceway base which is provided with conveniently located lines of weakening 210, as described above with reference to FIGS. 4a-4c. Such a raceway system leads to greater flexibility in the location of outlet devices in the one wireway associated with the power leads, and in the adjacent wireway associated with the data/telecom cabling. See for example in FIG. 3 where the "activations" for both power and data can be accommodated "anywhere" along the length of the individual wireways rather than requiring all "activations" to be provided in an oversized multipurpose installation such as illustrated at 310 in FIG. 3. Such an installation is possible in the present raceway system.

Turning next to FIG. 7, and in accordance with the present invention, a modular raceway system of the present invention comprises elongated raceway base plates 220 having the lines of weakening such as indicated generally at 210. Each base plate includes a forwardly projecting web portion 212 formed integrally with the back plate 214, either by spot welding or in the event the material is suitable by extrusion. This T-shaped base configuration gives rise to advantages not available in more conventionally shaped raceway base structures. As mentioned above, a 4-inch spacing between adjacent lines of weakening 210, 210 is preferred. Pre-punched holes spaced 2 inches from the lines of weakening also contribute to efficiency during installation.

In prior art raceways, of the type made from rolled steel for example, the raceway covers span the opening defined by a U-shaped base. See for example the two-piece steel raceway available from The Wiremold Company of West Hartford, Conn. under their 6000 and 4000 style two-piece metal raceway. The present invention on the other hand provides a raceway base plate that is of T-shape cross section such that the forwardly projecting web portion defines a divider 212 between two adjacent wireways, that are further defined by separate wireway covers 260, 280. This configuration allows these raceway covers 260 and 280 to be preassembled, or separately assembled with the raceway base 214, and consequently provides opportunity for the placement of outlet devices in staggered locations along the raceway as suggested in FIG. 7. Installing individual outlet devices, in one or the other of these separate wireways provides an advantage over the prior art two-piece metal raceways.

Still with reference to FIG. 7, the covers 260 and 280 are preferably identically configured, and the corresponding wireways also of equal cross-sectional area or volume. The lower raceway cover 280 is shown to be coextensive in length with that of the upper raceway cover 260 in FIG. 7, but this equivalency is not required. Each cover component can be of any length. Thus, individual outlet devices associated with each of these raceways can be provided in staggered relationship along each wireway so the raceway assembly can take a variation of forms as shown in FIG. 3 and FIG. 7.

Turning now to a more detailed description of the several ways in which outlet devices can be mounted in the raceway assembly, an L-shaped device bracket 270 is shown in FIG. 7, and includes an opening 270a for receiving an outlet device, such as indicated generally at 251. The L-shaped device bracket 270 includes rearwardly extending lower portions 270b and 270c, which have spaced-apart end portions 270d that are identically formed so as to be received on the angled flange 214a that extends the full length of the raceway base 214. The socket defining portions 270d of the L-shaped device bracket 270 are received by the flange 214a and allow the installer to pivot or snap the device bracket 270 in place, and in assembled relationship with the downturned lip 212a of the divider 212 on the raceway base. The device bracket 270 also has inwardly bent flanges that define end portions 270e, 270e provided specifically for this purpose.

It will be apparent that the L-shaped device bracket 270 can be configured to receive outlet devices such as that shown at 251. Outlet devices with different configurations, as for example data/communication jacks, can also be provided in the device bracket 270, and mounted in the upper wireway defined between the raceway base 214 and cover 260. A downwardly inclined flange 214b on the raceway base 214 cooperates with the upturned flange 212b on the divider wall 212 for this purpose. Since both wireways are preferably identical, the same device bracket 270 can be assembled in both the upper wireway and the lower wireway.

Still with reference to FIG. 7, a cover plate 290 is adapted to fit over the outlet device 251 and is fitted to the raceway itself even as does the device bracket. This cover plate overlaps the cover segments 260, 280. The cover plate 290, like the device bracket 270, is generally L-shape in cross-section, and includes a rearwardly projecting wall 290b, having a socket shaped end portion or flange 290d, which is adapted to engage the aforementioned flange 214a of the raceway base. The flange 290a fits between the socket portions 270d, 270d on the device bracket 270. As so constructed and arranged, the cover plate 290 can be assembled over the device bracket by providing this socket flange 290d in the space between the leg portions 270b, 270c of the device bracket, and pivoting the cover 290 in place over the outlet device 251. The upper marginal edge 290a is configured to be received between the portions 270e of the device bracket as assembled with the base flange 212a. A secure assembly is provided for the outlet device 251. Steel material is preferably selected for fabrication of the raceway base and covers and provides continuity or grounding throughout the assembly of a raceway constructed in accordance with the present invention. So too the device bracket 270 is also fabricated from an electrically conductive metal material.

Figure 8:
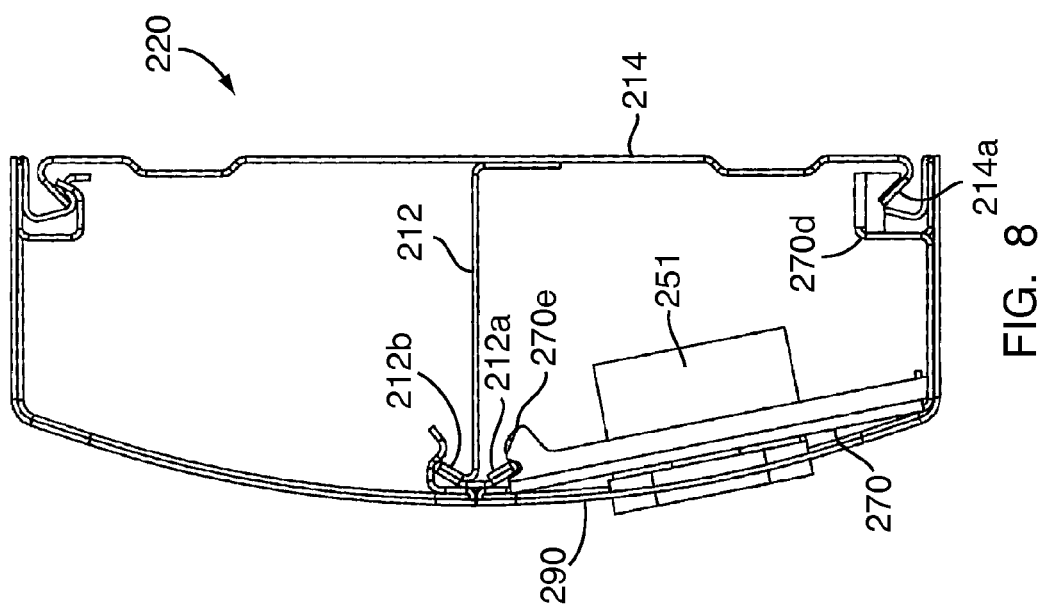
FIG. 8 shows in cross section the assembly of the components illustrated in FIG. 7.

FIG. 8 shows in cross-section the assembly described in the proceeding paragraphs, and illustrates the interlocking arrangement provided for between the raceway base flange 214a and the socket defining end portions of the rearwardly projecting legs 270d of the device bracket. Also shown in FIG. 8 is the rearwardly projecting portion 270e of the device bracket, which cooperates with the angled marginal edge 212a of the divider 212. The bracket cover 290 has openings, best shown in FIG. 7, for receiving the outlet device 251. The outlet device itself maybe secured to the device bracket 270, preferably by conventional screw fasteners (not shown).

Figure 9:
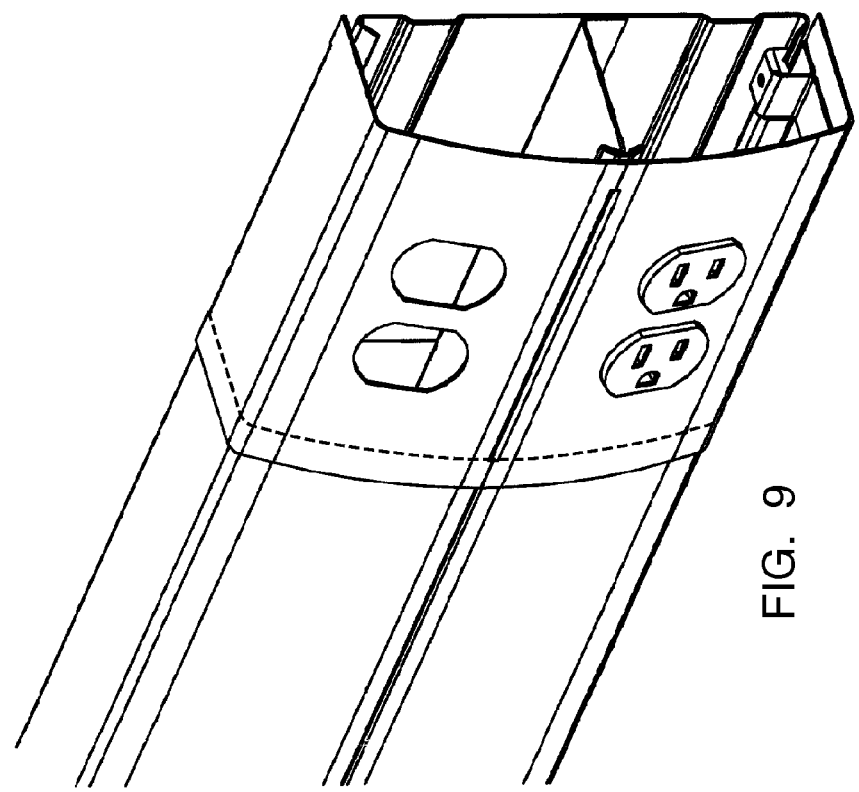
FIG. 9 shows in perspective view the assembled components of FIG. 8.

Although the staggered relationship between the devices in the upper and lower wireways illustrated in FIG. 7 is an advantage of the present invention, it will be apparent from FIGS. 7, 8 and 9 that outlet devices can be stacked one above the other in a conventional configuration. Thus, the raceway system of the present invention has all of the advantages of prior art systems, and has added advantages over prior art raceway systems.

Figure 10:
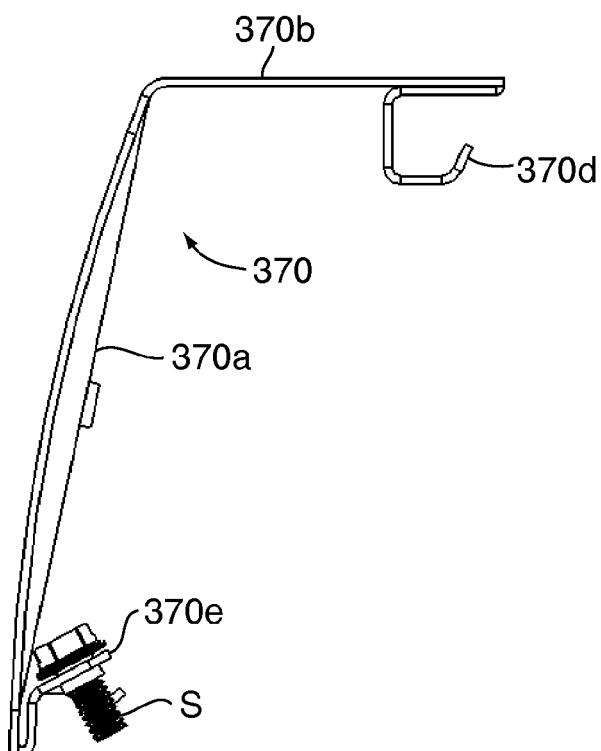
FIG. 10 is an end view of an L-shaped device bracket for assembly with the T-shaped base between aligned cover components associated with the top or upper wireway.
Figure 11:
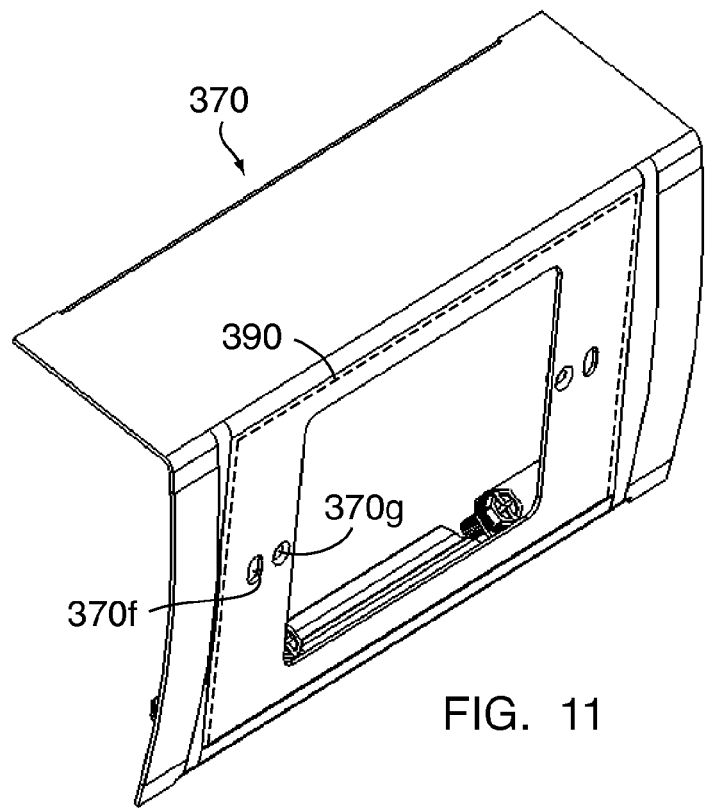
FIG. 11 is a top perspective view of the device bracket shown in FIG. 10.
Figure 12:
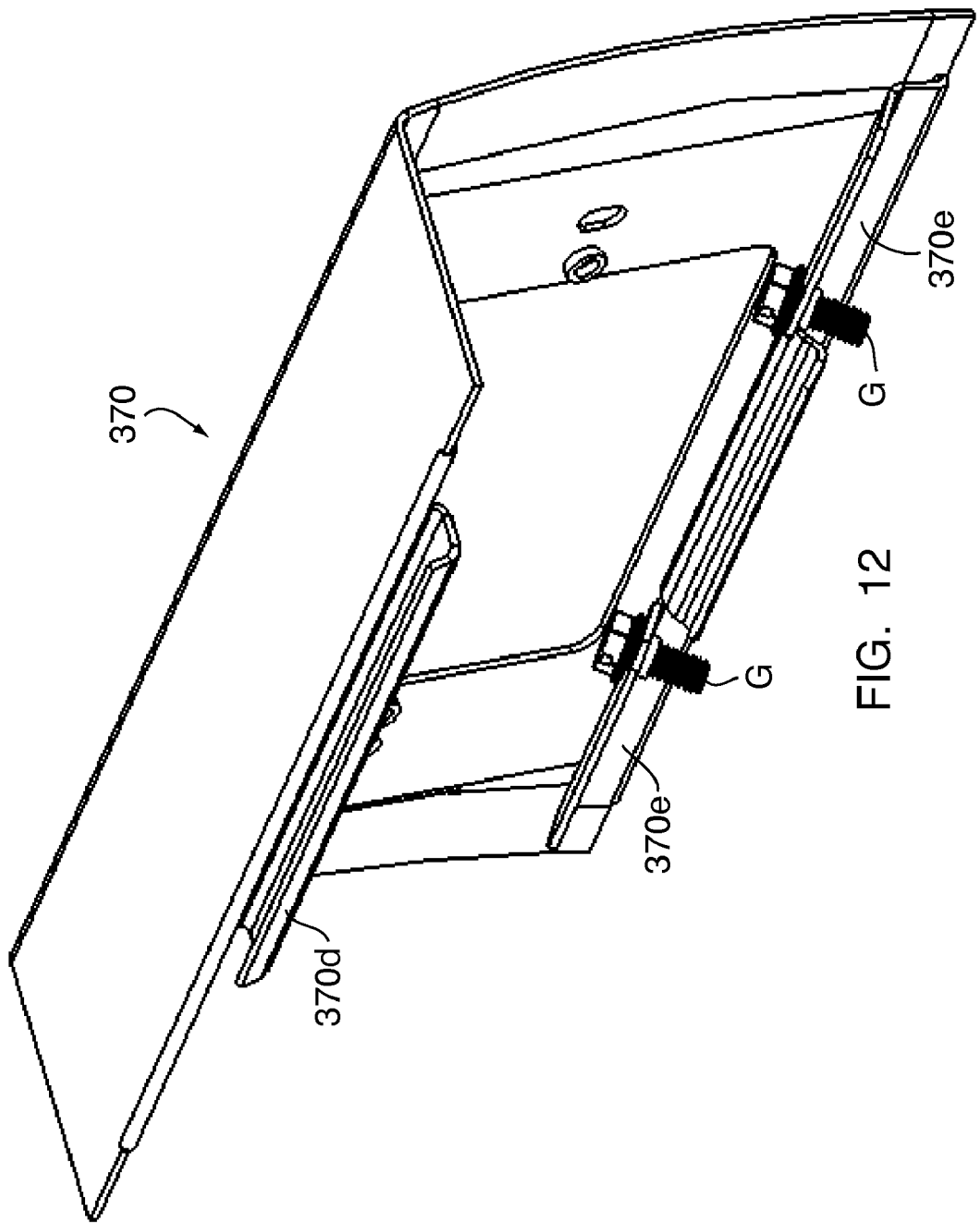
FIG. 12 is a rear perspective view of the device bracket of FIGS. 10 and 11.

FIGS. 10, 11 and 12 illustrate a device bracket 370 of slightly different geometry. The device bracket 370 is designed to accommodate a more conventional cover plate 390. The rectangular-shaped, conventional cover plate 390, which is representative of present day outlet device cover plates generally, can be fastened to the device bracket 370 as suggested by the broken lines of FIG. 11. As shown in FIG.

10, the device bracket 370 has a socket defining portion 370d formed on the inner top side of the L-shaped bracket, and this side 370b is oriented at an angle so as to form the L-shape with respect to the device bracket wall 370a, that will accommodate the outlet device itself.

FIG. 11 illustrates the device bracket 370 of FIG. 10 in a front top perspective view, with the outline of a conventional cover plate 390 being illustrated in broken lines to show how the device bracket 370 accommodates both the outlet device and the conventional cover plate. Suitable openings are provided adjacent to the outlet device opening in the device plate 370 for receiving both the screws associated with a conventional outlet plug, and other styles of cover plates associated with non-metal raceways.

Still with reference to the device bracket 370, FIG. 12 illustrates the shortened socket portion 370d of the device bracket 370, which engages the downturned flange portion 212a of the divider 212 in the base 214 of the raceway. A rearwardly projecting flange 370e provided on the lower edge of the device bracket 370 engages the flange 214 on the marginal edge of the web of the raceway base. Grounding screws G, G are provided to securely anchor the device bracket 370 in place, and to serve as a continuity or grounding connection as between the device bracket 370 and the raceway cover of the raceway assembly.

Figure 13:
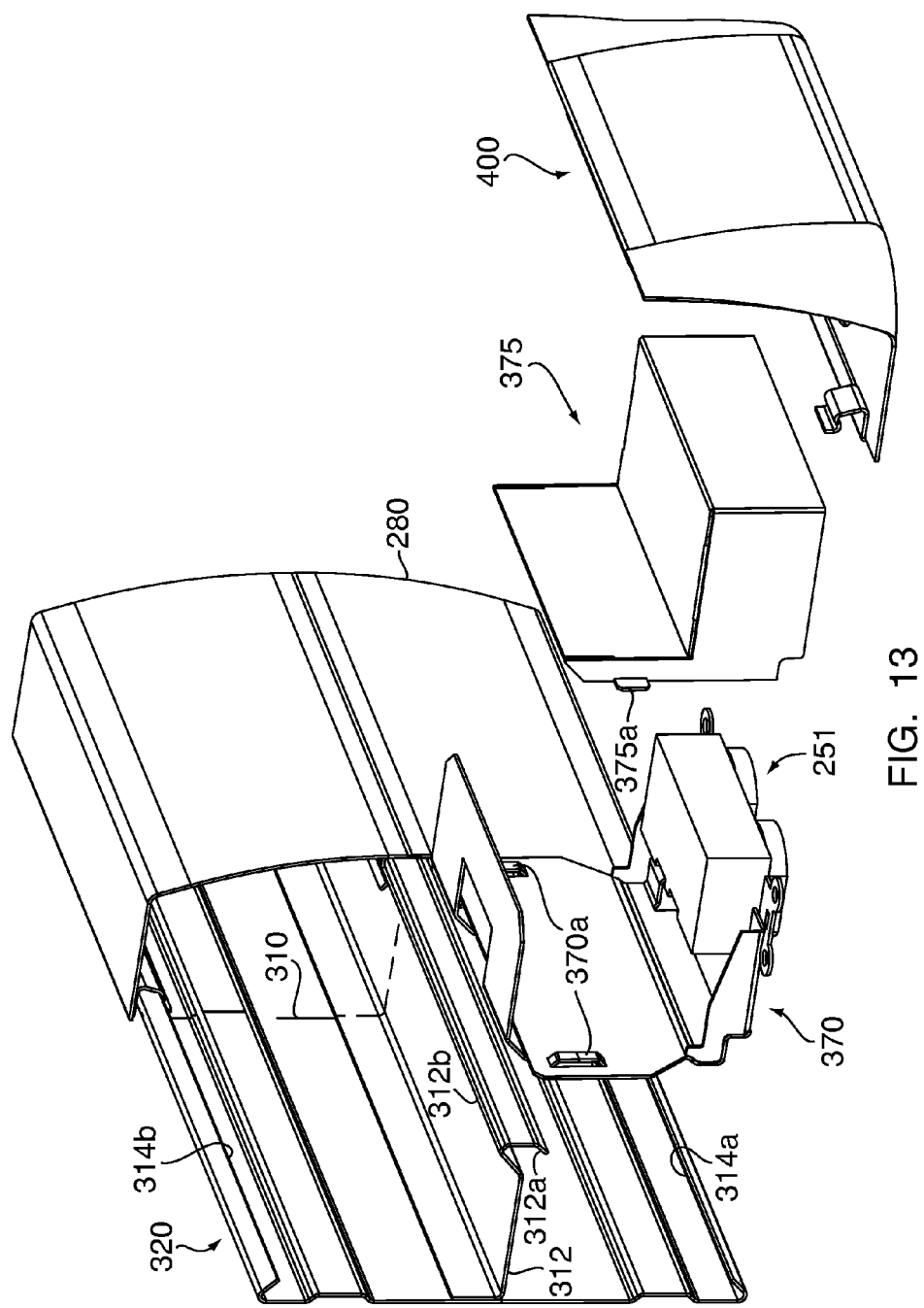
FIG. 13 is an exploded perspective view of an alternative design for a device bracket with a downwardly facing outlet device and enclosure and escutcheon components for assembly therewith.
Figure 14:
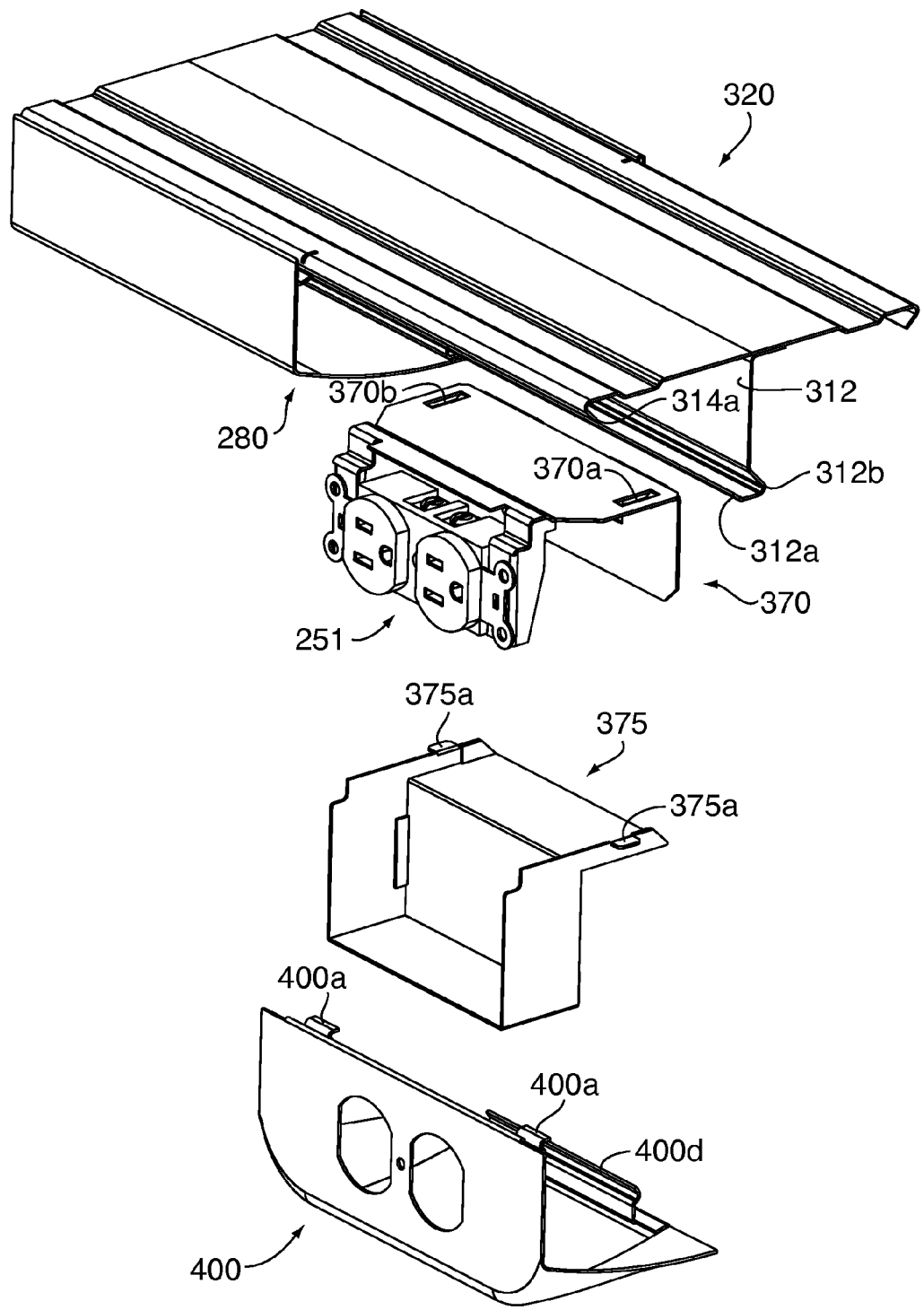
FIG. 14 is an exploded rear quartering perspective view of the device bracket and associated components.
Figure 15:
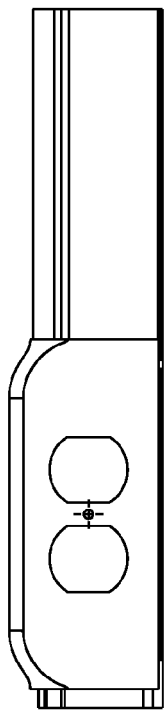
FIG. 15 is a bottom view of the assembled components from FIGS. 13 and 14.

FIGS. 13, 14 and 15 show still another version of outlet device bracket 370, one that also allows the device to be mounted between raceway cover components in the raceway assembly in order to provide the outlet plug at a location that does not detract from the overall appearance of the raceway assembly itself. More particularly, the device bracket 370 is so mounted that the outlet device 251 faces downwardly, affording the opportunity to hide both the outlet plugs from view, and to make the wires extending to and from that plug much less noticeable than is the case with present day outlet device-equipped raceways of the surface or wall mounted type.

FIG. 13 also shows a slightly modified configuration for the divider 312 in the raceway base 320, the raceway base being otherwise similar to that described previously, and having marginal edges 314a and 314b defined along the marginal edges of the base, and having angled portions 312a and 312b defined along the free end portion of the web or divider 312. Thus, the raceway base 320 is quite similar to that described previously with reference to the raceway base 220, and preferably includes lines of weakening 310 and mounting holes (not shown). It will be apparent that device brackets of the type described previously with reference to FIG. 7 and FIGS. 10-12 inclusively can also be used with the alternative raceway base plate 320 of FIG. 13.

In order to take advantage of a downwardly facing outlet plug 251 such as shown in FIG. 13, a unique configuration is provided for the device bracket. The device bracket 370 of FIG. 13 is shown in exploded relationship to the raceway base, whereas in FIG. 15 the device bracket is shown in an assembled relationship with the raceway base. A raceway cover is also shown assembled with the raceway base in FIG. 15.

With reference to FIG. 13, the device bracket 370 can be seen to have a generally U-shaped configuration, the lower legs of the "U" being spaced apart to receive the outlet device 251. The upper legs of the U are oriented parallel to these lower legs, and are provided alongside the divider 312. The outlet device 251 and its device bracket 370 are isolated from the lower wireway by a retaining box 375 mounted on the device bracket 370. These components are held in assembled relationship by the ears 375a on box 375 that cooperate with slots 370a in the device bracket for this purpose. Retaining box 375 not only affords protection for the connections made with the outlet plug 251 at assembly, but also serves to define a protective passageway that will accommodate wiring running through the lower wireway in the raceway assembly.

FIG. 14 shows these components from below, as adapted to be assembled with the raceway base 320 to be provided between spaced raceway covers 280. The cover plate 400 serves as an escutcheon plate for the downwardly facing outlet plug 251. The socket portions 400a and 400d, provided at the ends of the L-shaped cover 400, allow snap-in assembly of the cover 400. More particularly, these socket portions fit onto the flanges 312a and 314a of the base 312. The cover plate 400 is designed to accommodate the outlet device 251, but other configurations (not shown) can be fabricated to accommodate other types of electrical devices, such as jacks or down lights as shown in FIG. 5.

By way of summary and with reference to FIGS. 13, 14 and 15, it will be apparent that raceway assemblies fitted with an outlet device plate in the downwardly facing wall of the raceway present an architecturally pleasing raceway appearance as this configuration obscures the outlet plug from view. Thus, the eye of the observer does not pick up such locations for the outlet plugs as readily as with conventional raceways generally. Further, the electrical cords that will be later plugged into such downwardly facing outlets located in the lower wall of the raceway are also obscured from view, giving rise to an improved appearance for the space serviced by the raceway of the present invention, as compared to conventional raceways generally.

In addition, this configuration puts the plug in a more protected environment. Whereas conventional, present day raceways include a base component of generally U-shape with vertically spaced top and bottom boundaries or walls formed integrally with a generally flat base which is mounted to the wall, the provision for outlet devices in that lower wall is virtually precluded, or at least rendered difficult, by virtue of the fact that the wall is integral with the base. In the T-shaped raceway base plate of the present invention, on the other hand, no bottom wall is required, and the bottom wall of the raceway is instead defined by the cover, leading to greater flexibility for locating outlet devices. More particularly, the cover's L-shape cross section affords opportunity for mounting downwardly facing device brackets, and brackets for other purposes such as lights, without requiring any cutting away of the raceway base. Therefore, the raceway design of the present invention affords not only a more aesthetically pleasing appearance to the observer, but also provides for functional advantages not readily available with raceway configurations currently available.

As previously described with reference to FIGS. 4a-4c, raceway mounting plates can be provided at spaced intervals along a wall, and preassembled raceway assemblies of predetermined length can be secured to these mounting plates to leave a gap between the adjacent end portions of the aligned raceway base plates. Thus, these mounting plates serve as coupling means to provide a continuation of the rear boundary of the upper and lower wireways so that the wireways need not be defined by the wall, but as instead defined by the metal covers and the metal mounting plates at least in the areas of these gaps. As mentioned previously, the lines of weakening in the raceway base plates facilitate the installation process in that the precise cutting of the raceway base (required with present day U-shaped two piece metal raceway generally) is rendered unnecessary, and the installer can instead make rough cuts or simply break apart the raceway base at a line of weakening.

It is also a feature of the present invention that these raceway base plate components can be assembled directly to the wall without requiring mounting plates. In order to provide another form of coupling means, to form a continuation of the metal back plane for the wireways defined by the aligned L-shaped raceway base components, the present invention contemplates individual coupling wireway elements, in the form of the couplings shown at 250, 250 in FIG. 16. FIG. 16 shows a raceway base plate 220 of T-shape cross section having a plurality of score lines 210, 210 in the manner described previously with reference to FIGS. 4a-4c. In lieu of the mounting plates shown in FIGS. 4a-4c, coupling means, in the form of elements 250, 250, are snapped into place between the projecting T-shaped web 212 and the rear wall 214 of the raceway base 220. More particularly, the marginal edges of each coupling member or element 250 are received between the lip 212b at the free end portion of the web 212, and the longitudinally extending marginal edge 214a of the back portion of the raceway base. See FIG. 16 for details on the preferred form for the T-shaped raceway 225. With reference to FIG. 16a, note the spacing "X" between the lines of weakening, and the spacing "2X" between the knock-out openings and mounting holes 502. X is preferably a division of 16 and 24, and 4 inches has been found to be a suitable spacing X.

Figure 17:
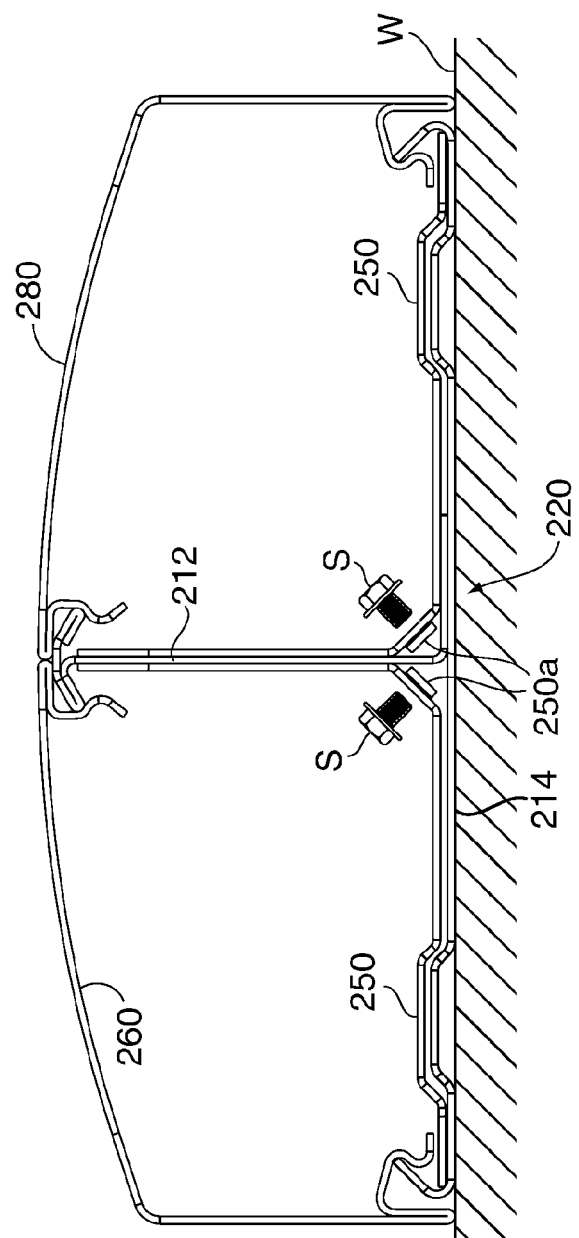
(FIG. 17 shows the couplers 250, 250 secured into the raceway base 220 in more detail.)
Figure 17A:
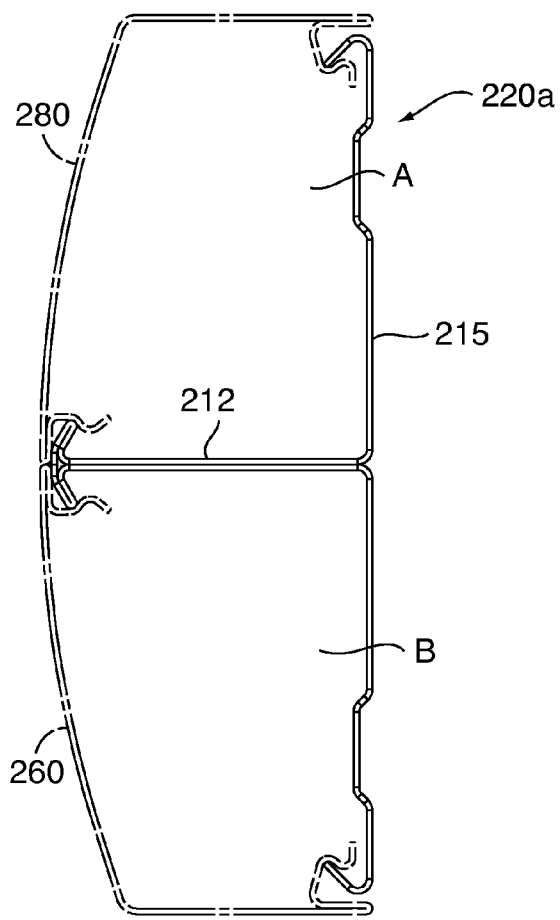

FIG. 17a shows a preferred one-piece, metal raceway base configuration 220a with the top and bottom wireways, A and B respectively, defined by a web divider portion 212 formed with a double thickness, such that the web 212 forms a 90° bend with respect to the base 215.

Figure 17B:
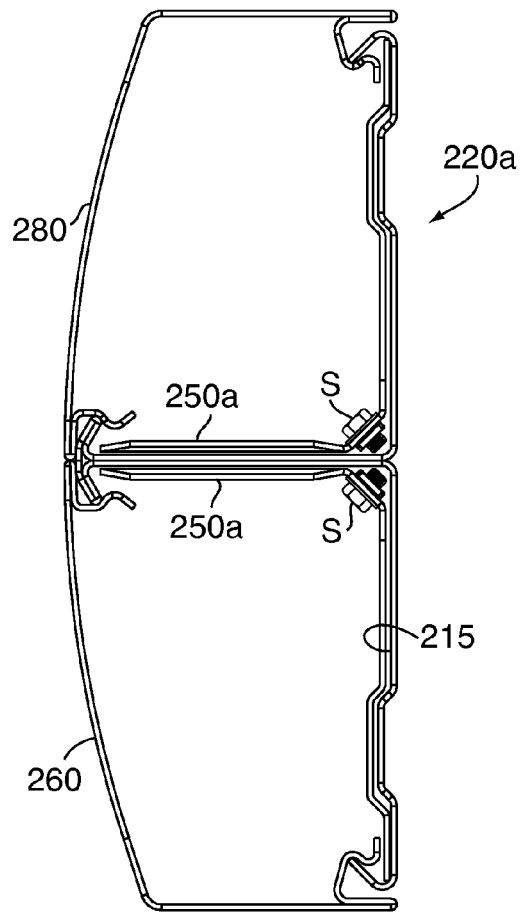
FIG. 17b is a view of the base in FIG. 17a, assembled as in FIG. 17.

FIG. 17b is similar to FIG. 17, but shows slightly different coupler elements 250a, 250a in combination with the base 220a of FIG. 17a.

FIGS. 17 and 17b show the raceway coupling members 250 and 250a as held in place by screw fasteners S, S. The screw fasteners are threadably received in openings provided for this purpose at the vertex of each coupling member 250 and 250a. FIGS. 17 and 17b also illustrate the nesting relationship between the back wall 214 and 215 of the raceway base 220, 220a and these coupling elements 250, 250a. It will be apparent that these coupling elements 250, 250a serve the purpose of coupling adjacent end portions of raceway base members as described above, without interfering with the raceway covers 260 and 280, the cover components being held in place by the same marginal edge portions of the raceway base and the lips defined at the free end portions of the web 212 all as described previously with reference to these raceway covers 260 and 280. Thus, the separate wireways defined by the T-shaped raceway base 220, 220a and the raceway covers 260, 280 are continued and defined in part by these unique raceway coupling elements 250, 250a.

FIG. 18 illustrates raceway assemblies 200, 200 coupled together, but in a way such that the coupler 500a also accommodates a T-connection between the upper wireway and a smaller electrical conduit 500 oriented at right angles to the raceway of the present invention. The coupler 500a is provided with a knock-out opening to accommodate the conduit 500 and/or a large conduit can also be accommodated by reason of a somewhat larger knock-out opening.

Figure 19:
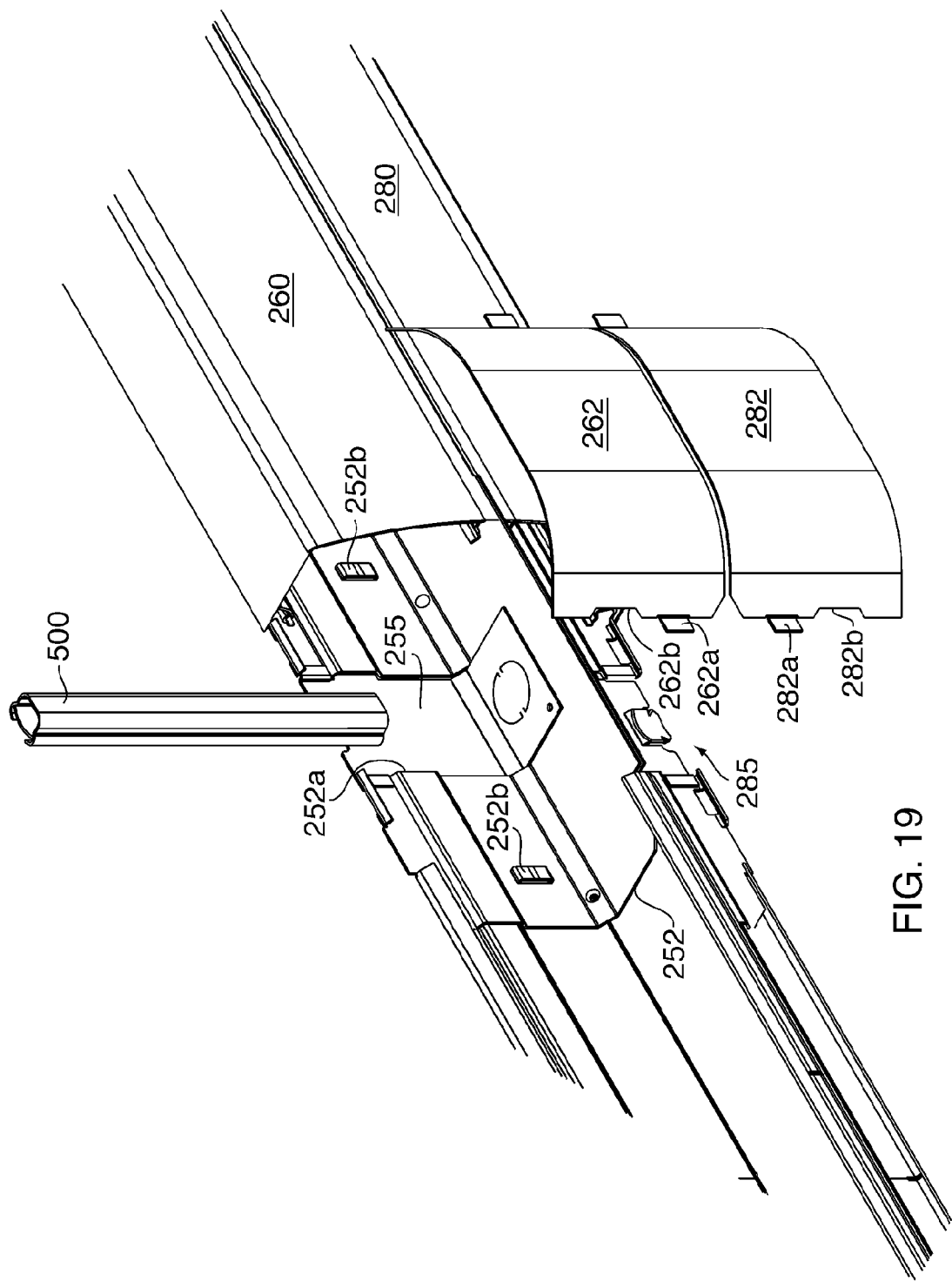
FIG. 19 is an exploded perspective view of some of the assembled components provided between the assembled raceway sections of FIG. 18.

FIG. 19 shows the coupler cover removed, and illustrates a coupling element 252 associated with the upper wireway having a cutout region 252a for receiving a bracket 255 designed to accommodate the conduit 500. As with the previously described couplings 250, 250, coupling element 252 spans the gap between spaced but aligned raceway base components. In accordance with the present invention, cable guides 262 and 282 are provided to afford some protection for the cables or conductors provided in the wireways defined by the T-shaped base and the raceway cover components 260 and 280. The cable guides 262, 282 are configured to allow such cables to pass through the wireways, when assembled with the coupling element 252, but to allow cables within the conduit 500 to run downwardly into the upper wireway, and to be fed in one direction or another of the upper wireway shown in FIG. 19. Tabs 262a on the upper cable guide 262 snap into slots 252b provided for this purpose in the wall of the coupling element 252 for this purpose. Relieved areas 262b allow cables within the conduit 500 to clear the cable guide 262. The lower cable guide 282 may be used to provide an access point in the lower wireway for feeding wires from the wall structure into the lower wireway. A port 285 is provided for this purpose in the lower coupling element as best shown in FIG. 19.

Figure 20:
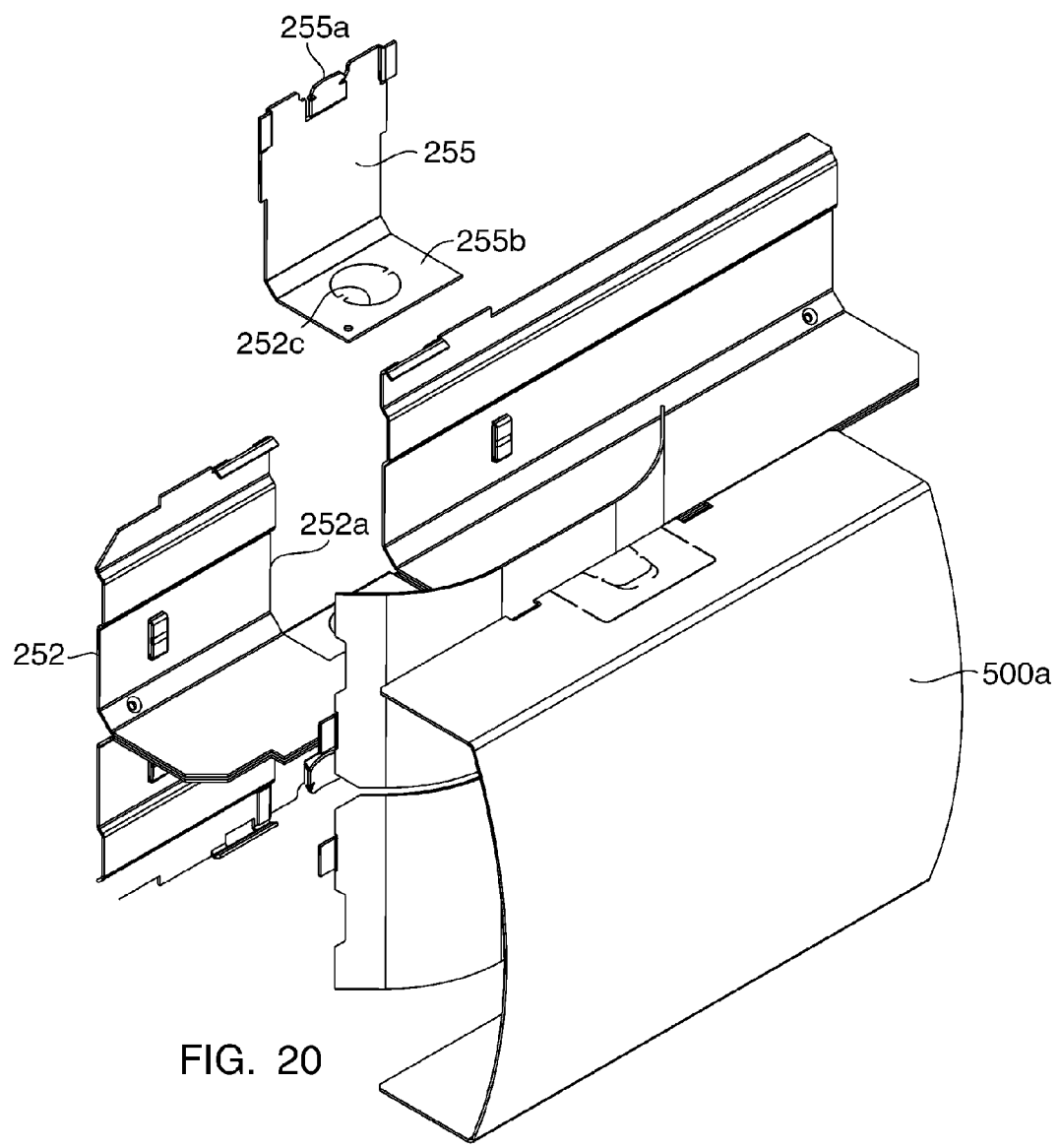
FIG. 20 is an exploded perspective view similar to FIG. 19, but without the raceway sections, which shows the raceway couplers provided in the top and bottom wireways defined by the raceway base plate and the raceway covers.

FIG. 20 is an exploded view showing the upper coupling element 252 having a relieved region 252a for receiving the L-shaped bracket 255 that serves to anchor the conduit 500 by means of tab 255a, and to include a lower portion 255b that defines a knock-out opening for cables run to the lower wireway defined by the raceway assembly of FIG. 19. FIG. 20 also shows the coupling cover 500a together with its knock-out openings in the top wall for receiving conduits such as illustrated at 500, or larger conduit as dictated by the needs of a particular installation.

Figure 21:
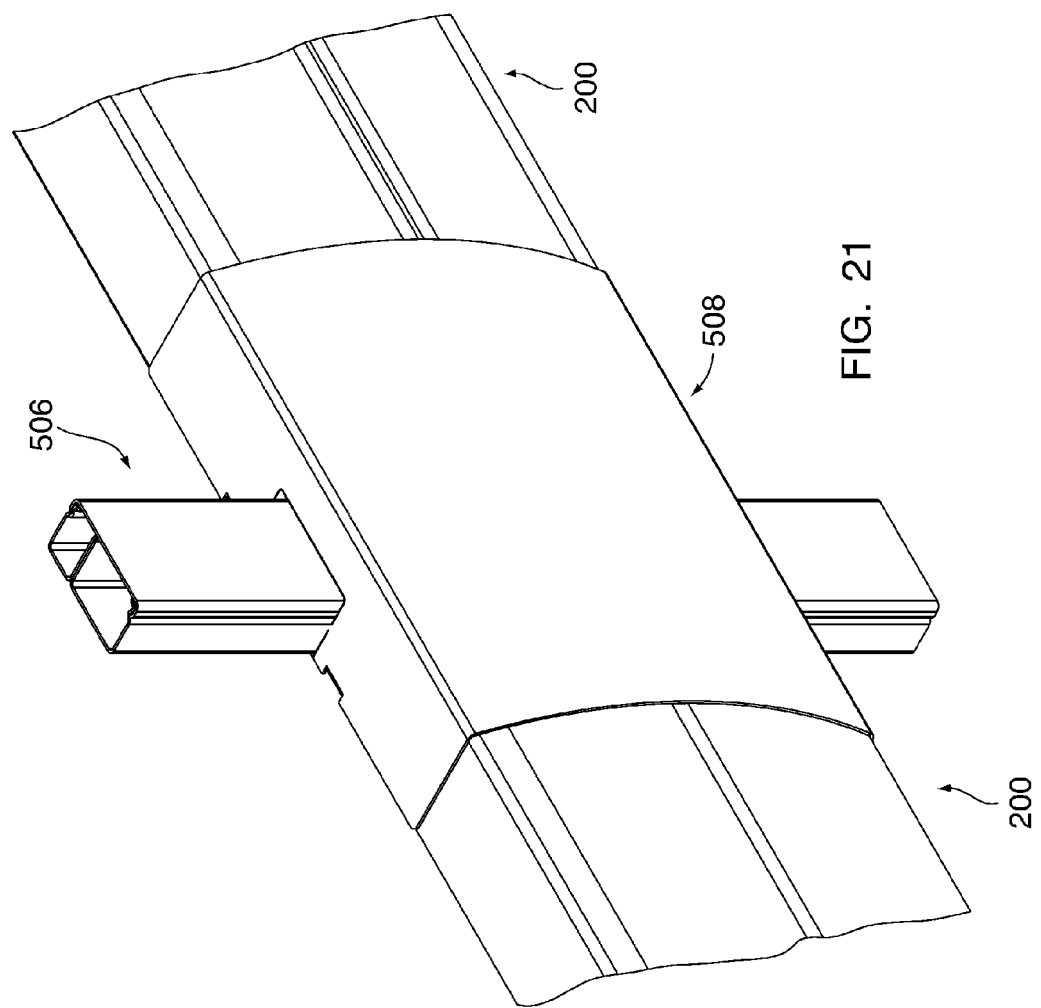
FIG. 21 shows two aligned raceway sections and a transition fitting similar to that shown in FIGS. 18, 19 and 20, but instead of providing access to wiring from and to another raceway 506, the fitting 508 serves to bridge raceway 506 without any cross feeding of cables or wires.

FIG. 21 shows adjacent raceway assemblies of the present invention coupled as described previously to afford a bridge between the wireways defined therein and a crossing raceway or conduit 506. Coupling 508 is provided with knock-out openings in both its top and bottom walls for this purpose.

Figure 22:
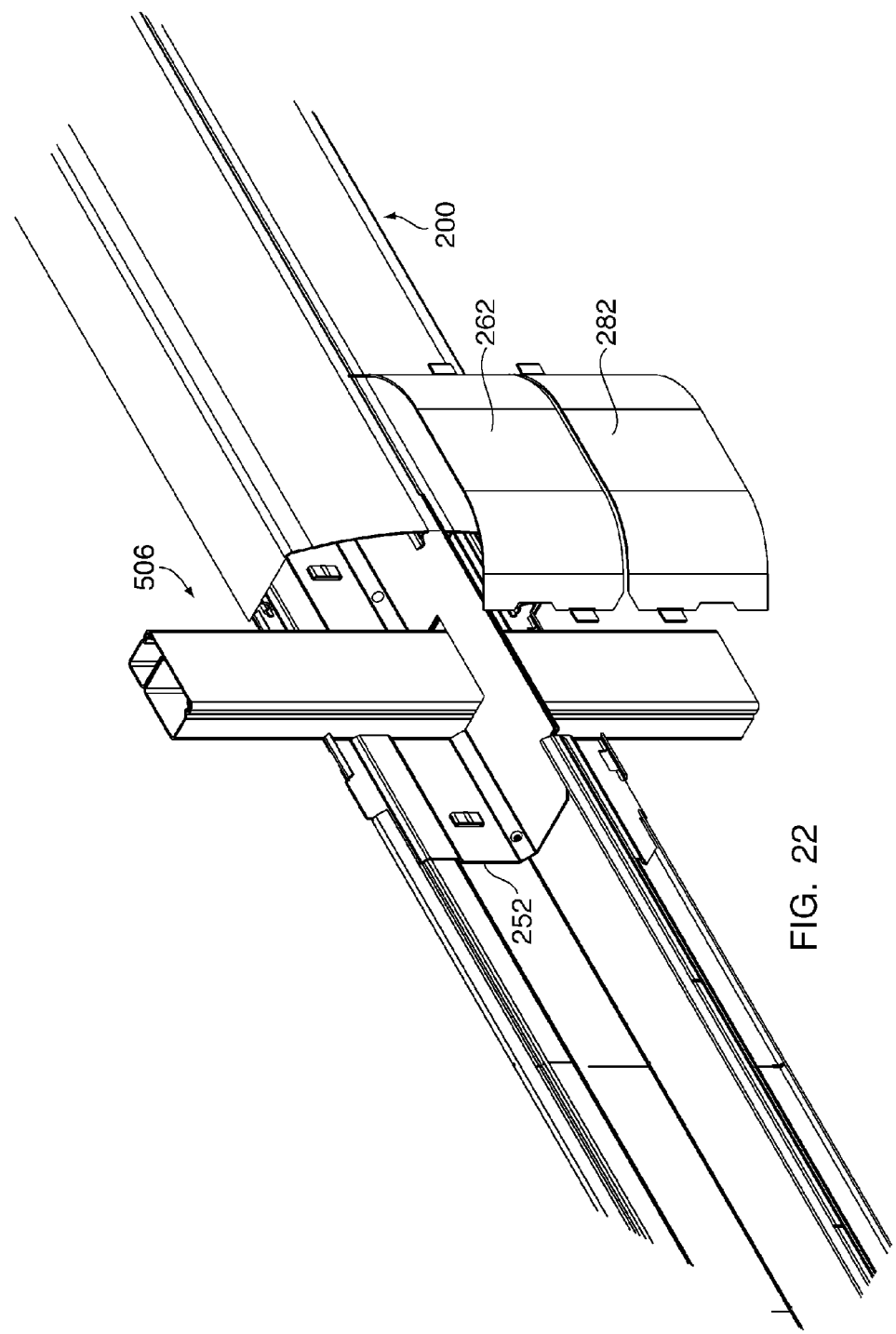
FIG. 22 shows the FIG. 21 assembly, but without the raceway covers in one base plate, and without the transitions fitting cover.

FIG. 22 shows the crossing conduit 506 of FIG. 21 in greater detail, together with the raceway coupling elements 252 required to bridge the gap between the aligned ends of the raceway base components. From FIG. 22 it will be apparent that the L-shaped bracket of the previous views (FIGS. 20 and 21) is not required, and it will further be apparent that the crossing conduit 506 does not feed cables to the wireways defined in the raceway of the present invention. However, cable guides 262 and 282 are utilized in the same manner as described above to facilitate feeding of cables in these upper and lower raceways.

Figure 23:
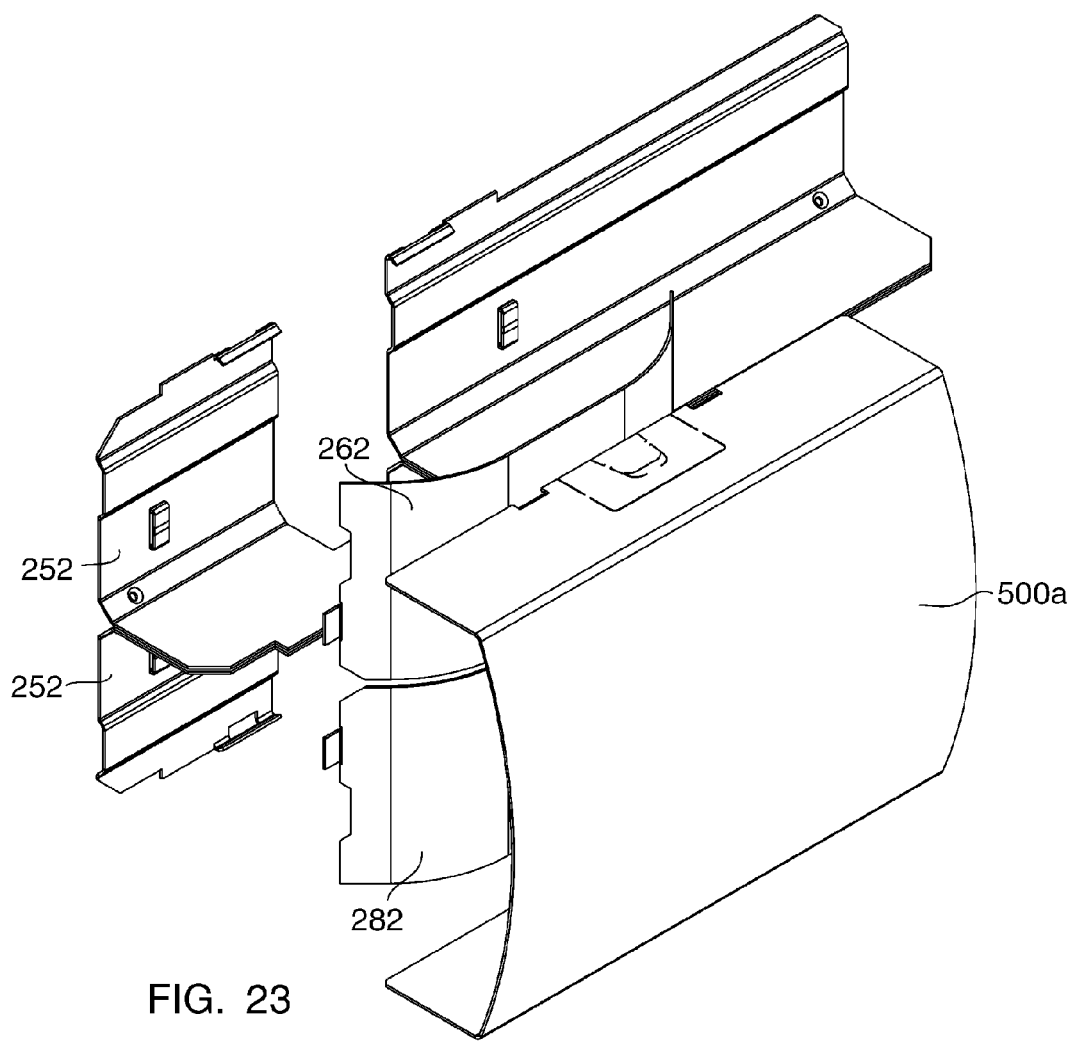
FIG. 23 shows the FIG. 21 assembly, but without the raceway base and covers, to better illustrate the unique coupling means comprising two L-shaped coupling elements arranged alongside one another an coextensively with respect to the spine (not shown) of the raceway base.

FIG. 23 shows the coupling elements 252, 252 associated with the upper and lower wireways of FIGS. 21 and 22, as well as the cable guides 262 and 282, and coupling cover 500a with a knock-out opening pattern similar to that of the coupling cover 500a of FIG. 18.

In FIGS. 24-26 a raceway cover 270 has generally rectangular cutouts 270a for presenting outlet plugs 275 at longitudinally spaced predetermined intervals along the cover. The cover 270 is similar to those described above and has longitudinally extending marginal edges of base plate as shown at the lower edge of base 320. An inner recess 270c forms a pocket to receive the edge 276a of a device bracket 276, also of L-shape, but fits into cover 270 to form a cavity for the outlet device 275. An upper edge 276b of L-shaped device bracket 276 fits into a recess defined at the top inside edge of cover 275a, shown at 270d. The device bracket 276 is of shorter extent than the outlet device 275, as indicated in FIG. 25.

As suggested in FIG. 24, power cables in the lower wireway of the raceway are connected to the terminals of the outlet devices in a conventional manner. These L-shaped covers 270 can be preassembled, as suggested in FIG. 26, for use with selected raceway assemblies of the type described above, for simplifying the task of an installer.

Figure 27:
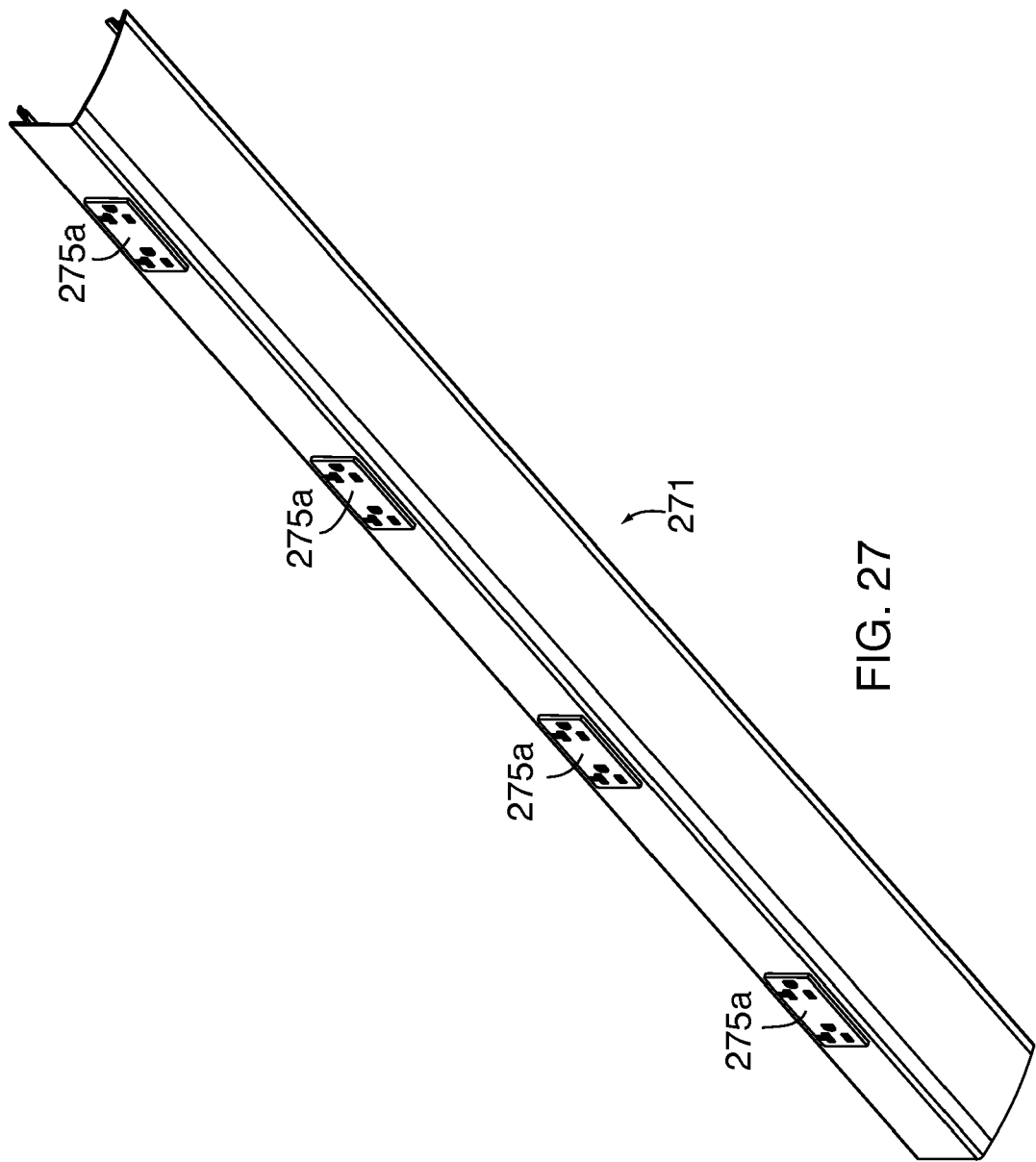
FIG. 27 shows a lower raceway cover component 271 with pre-wired outlets 275a in the lower wall of the cover, rather than in the forward wall as depicted in FIGS. 25 and 26.

FIG. 27 shows outlet devices of the duplex type mounted in the downwardly facing wall of a raceway cover component 271. Data/communication devices (not shown) of appropriate size might also be mounted in this lower wall of lower raceway cover 271. This is so in spite of the preference for locating the data/communication cabling in the upper wireway, and the power cables in the lower wireway of a raceway assembly incorporating the present invention. The T-shaped base member preferably has knock-out openings such as shown in FIG. 16a that allow wiring from the upper wireway to pass through the web portion of the T-shaped base for this purpose.

FIGS. 28a-28b, 29a-29g, and 30a-30i show an additional embodiment of a downward facing receptacle system or assembly 600 for a cable raceway 602. Here, the cable raceway 602 is of the type having a "low profile," rectangular configuration, with one or more interior wireways 604a, 604b running the length of the raceway 602. The purpose of the assembly 600 is for the deployment of an electrical outlet or receptacle 606 along the raceway 602, with the outlet 606 being oriented in a generally downward facing manner with respect to the raceway 602 and the wall or other support surface 608 to which the raceway 602 is affixed. As should be appreciated, the assembly 600 allows the raceway 602 to be outfitted with a downward facing outlet, in an aesthetically pleasing and protected manner, even though the raceway 602 is not sized or otherwise configured to accommodate an outlet directly in its bottom wall.

The assembly 600 includes as its primary components a device bracket 610 and a downward facing device faceplate or cover 612. Generally speaking, the device bracket 610 performs the functions of (i) covering the front and bottom sidewalls of the raceway in a selectively accessible manner (e.g., the raceway interior, although covered, is accessible through knock-outs or other types of access gateways), and (ii) supporting an outlet 606 below the raceway 602 in a downward facing orientation. The cover 612, complementary in shape to the bracket 610, serves to cover the raceway 602, bracket 610, and outlet 606. The cover 612 is dimensioned to accommodate the routing of electrical wires/cables from the raceway 602 to the outlet 606, and has a faceplate-type bottom surface 614 that matches the outlet 606.

Figure 28A:
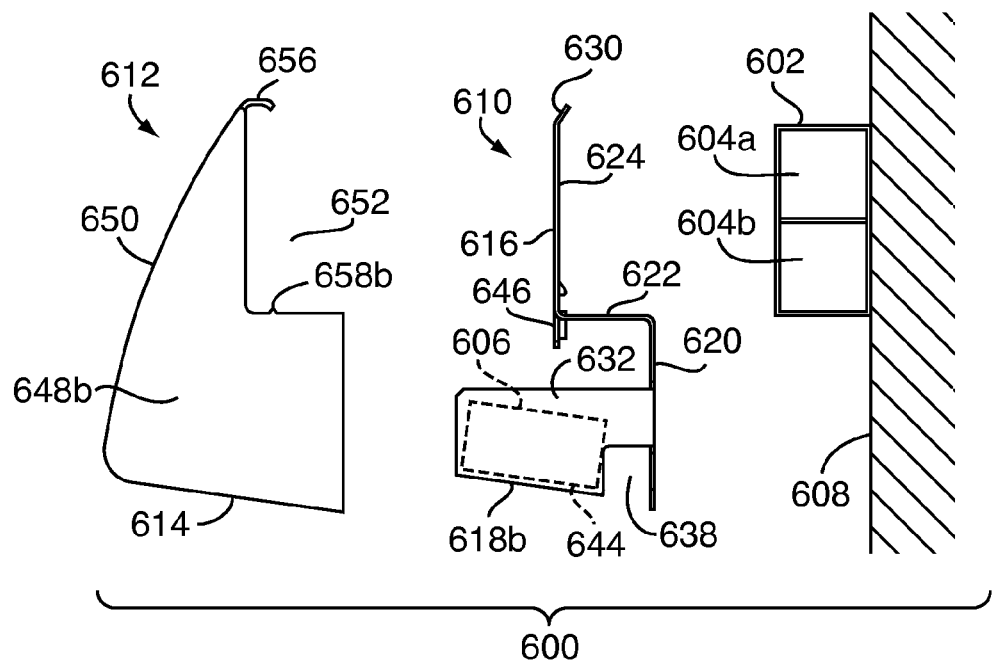
FIGS. 28a and 28b are exploded and side elevation views, respectively, of an additional embodiment of a downward facing receptacle system or assembly for a cable raceway.
Figure 28B:
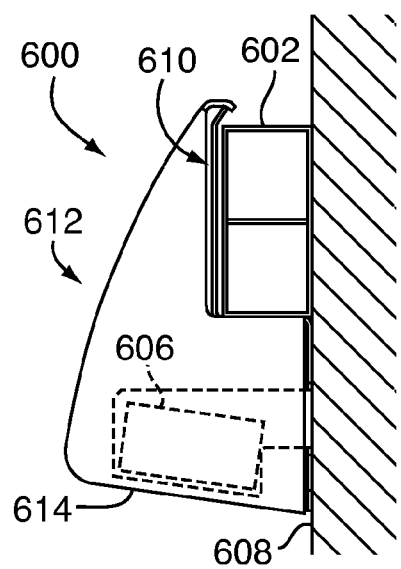
Figure 29E:
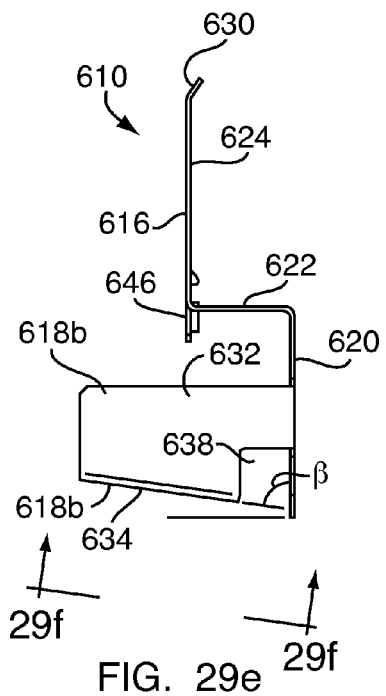
Figure 29F:
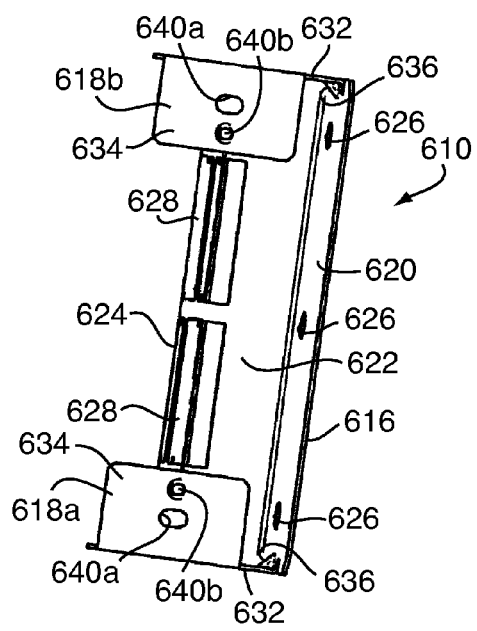

The bracket 610 is shown in more detail in FIGS. 29a-29g. The bracket 610 includes a step-shaped (in cross section) body 616 and a device support for connecting an outlet 606 to the bracket 610. According to one embodiment, and as shown in the figures, the device support is comprised of first and second opposed device connection flanges 618a, 618b. The body 616 includes a bottom, wall-mount plate 620, a "step" portion 622, and an upper, raceway access plate 624. The bottom plate 620 is generally rectangular and flat, and includes one or more mounting apertures 626 extending through the bottom plate 620. The step 622 is also generally flat and rectangular, and is attached to the bottom plate along an upper edge of the bottom plate 620. The step and bottom plate are generally perpendicular to one another. The upper plate 624 is also generally flat and rectangular, and is attached to a forward edge of the step 622. The upper plate 624 lies generally perpendicular to the step 622, and is thereby offset from and generally parallel to the bottom plate 620, as best illustrated in FIG. 29e. The upper plate 624 includes various knock-outs or other access gateways 628, and a rearwards-angled lip or flange 630 running along the top edge of the upper plate 624. ("Access gateway" refers generally to any built-in mechanism for the selective passage of cables through the upper plate or other structural member, including (i) pre-existing passageways, holes, or apertures and (ii) built-in mechanisms for selectively creating passageways, holes, or apertures, such as cable knock-outs.) As shown in FIGS. 28a and 28b, the bracket 610 is complementary in shape to the raceway 602. In particular, the width of the step 622 is slightly larger than the depth of the raceway 6102, and the upper plate 624 has a slightly larger height than the height of the raceway 602. Thus, when the bottom plate 620 is placed against a wall or other support surface 608, with the step 622 abutting (or lying proximate to) the bottom wall of the raceway, the upper plate 624 covers the front surface of the raceway 602, with the lip 630 extending above and along the top edge of the raceway 602. For deployment, the bracket 610 is positioned with respect to the raceway as shown in FIG. 28b, and the bottom plate 620 is affixed to the wall 608 by driving fasteners (not shown) through the apertures 626 and into the wall. Although the upper plate 624 covers the front of the raceway, the interior of the raceway is selectively accessible by removing one or more of the knock-outs 628, typically before attaching the bracket 610 to a wall surface 608.

The device connection flanges 618a, 618b lie on either side of the bracket 610, in an opposed relationship to one another. Each device connection flange 618a, 618b includes a side extender 632 and an angled tab 634. The side extender 632 is attached to a side edge of the bottom plate 620, and extends generally perpendicularly outwards from the bottom plate 620 in the direction of the step 622, and past the plane of the upper plate 624. The connection between the side extender 632 and bottom plate 620 may be reinforced using a gusset structure 636, as shown in FIGS. 29c and 29d. The angled tab 634 is attached to a bottom edge of the side extender 632, and lies generally perpendicular thereto. The angled tab 634 extends inwards towards the center area of the bracket 610. The angled tab 634 is oriented generally perpendicularly at an angle "β" with respect to the bottom plate 620, where $95° \geq \beta \geq 75°$. The side extender 632 may include a notch 638 for establishing a clearance between the angled tab 634 and bottom plate 620. (Alternatively, the angled tab 634 may extend into close vicinity to the bottom plate 620.) The angled tab 634 includes one or more fastener apertures 640a, 640b that extend through the tab.

Figure 29G:
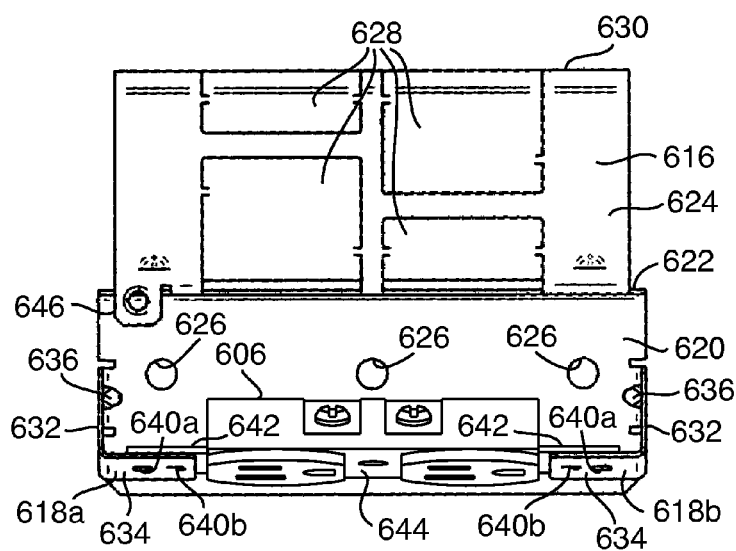

The angled tabs 634 of the two device connection flanges 618a, 618b are coplanar, and are spaced apart by a distance that generally corresponds to the length of the outlet device 606 to be supported by the bracket 610. For example, as shown in FIG. 29g, the fastener apertures 640a, 640b may be spaced apart by a distance that corresponds to the distance between the distal ears or tabs 642 of an outlet device 606. Thus, in operation, the device connection flanges 618a, 618b provide opposed support and connection surfaces for an outlet 606, where the outlet 606 is positioned below the raceway 602 in a crosswise manner, and with its front access face 644 oriented generally downwards from the raceway 602. More specifically, the access face 644 of the outlet lies generally perpendicular to the wall or other support surface 608, at the angle β, where $95° \geq \beta \geq 75°$. (As noted above, "access face" refers to the portion of an electrical device that is meant for general user access, such as the finished, female electrical connection of a data port or electrical outlet, a light emitting device/cover, or the like.)

Although the outlet access face may lie perpendicular to the wall 608 (e.g., β=90°), lit may also be angled slightly upwards, up to an angle β of about 75°. In this manner, the outlet is oriented generally downwards, thereby providing the aforementioned aesthetic and safety/environmental advantages, but it is also easier to see and access the outlet. The outlet access face may also be angled slightly inwards, e.g., β=95°, which may further protect the outlet from possible environmental contamination.

The bracket 610 may include additional features, such as a grounding tab 646 for connecting a ground wire, other connection tabs or apertures (not shown) for connecting the bracket to a wall or raceway, or the like. Typically, the bracket 610 is made of a conductive metal material, such as zinc plated steel, by stamping or otherwise forming an appropriately shaped flat blank, and then bending the potions of the flat blank into the configuration shown in the figures, using standard manufacturing methods.

Figure 30A:
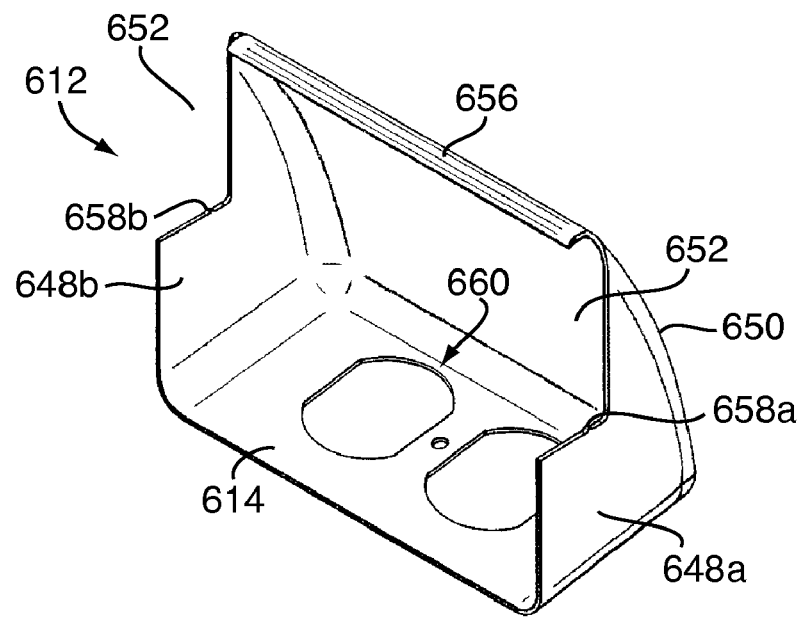
Figure 30B:
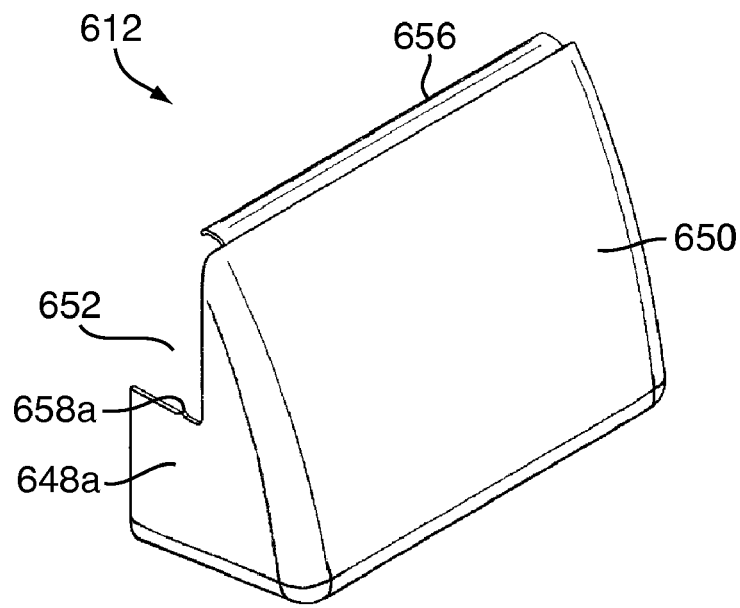
Figure 30C:
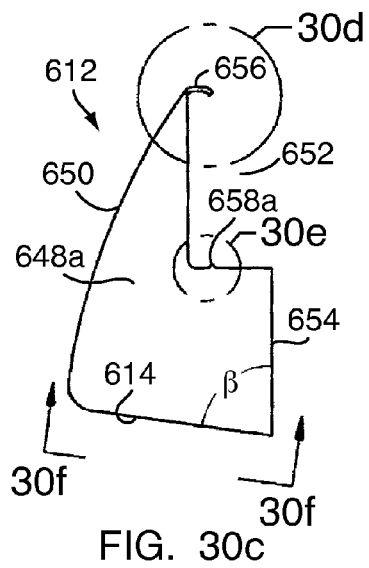
Figure 30D:
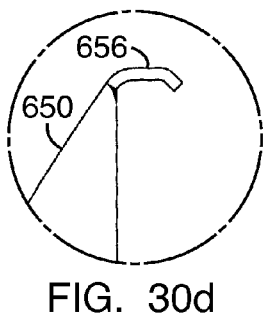

FIGS. 30a-30i show the downward facing faceplate or cover 612 in more detail. The cover 612, made of a finished metal or other sturdy material such as a polymer, includes first and second, generally parallel sidewalls 648a, 648b, the faceplate portion 614, and an arcuate front wall 650. (The front wall may instead be planar or configured otherwise than arcuate in shape.) The faceplate 614, generally rectangular in shape, lies perpendicular to and disposed between bottom edges of the sidewalls 648a, 648b. The arcuate front wall 650 extends from a leading edge of the faceplate 614, and arches back up over the faceplate 614. The front wall 650 is connected and disposed between the two sidewalls 648a, 648b, which have arcuate leading side edges complementary in shape to the front wall 650. Each sidewall 648a, 648b includes a rectangular side notch 652 that corresponds to the shape of the raceway in cross section. As best shown in FIGS. 28b and 30c, the faceplate portion 614 is angled, at the angle β, to correspond to the angled tabs 634 of the device connection flange 618a, 618b. More specifically, the faceplate 614 is angled with respect to a plane 654 defined by the rear side edges of the sidewalls by angle β, where $95° \geq \beta \geq 75°$.

Figure 30E:
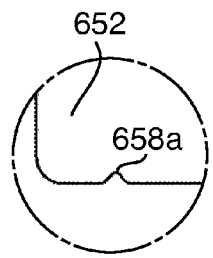
Figure 30G:
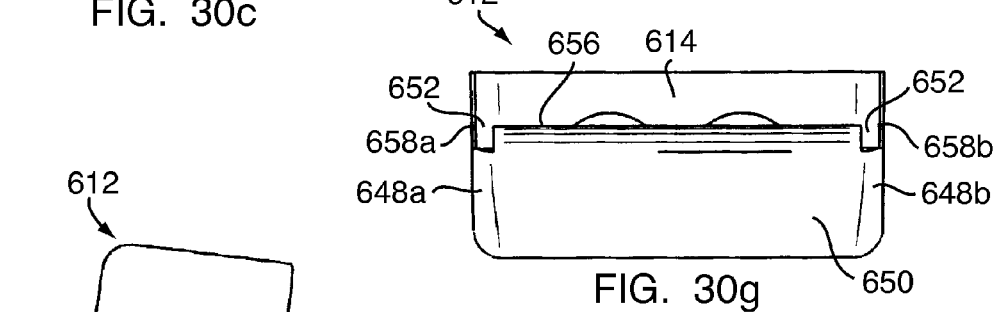

The cover 612 also includes a rearwards-angled top flange 656 and raceway engagement dimples 658a, 658b. As shown in FIG. 30c and in detail in FIG. 30d, the top flange 656 is attached to the top edge of the arcuate front wall 650, and lies between, but not coextensive with, the two sidewalls 648a, 648b. The top flange 656 fits over the rearwards-angled lip or flange 630 attached to the top edge of the bracket 610, as shown in FIG. 28b, and in fact the bracket and cover may be correspondingly dimensioned for the top flange 656 to snap onto or otherwise engage the lip 630 when the cover and bracket are deployed over a raceway 602. The dimples 658a, 658b, shown in detail in FIG. 30e, are disposed on the top edges of the sidewalls 648a, 648b in the area of the rectangular notch 652. The dimples 658a, 658b fit in an indentation in the raceway 602, located between the junction of the raceway base and cover, for the cover to match the contour of the raceway. The dimples may be alternatively placed, or the cover may be provided with similar such features, for matching the contour of the raceway. This will depend on the particular configuration of the raceway.

Figure 30F:
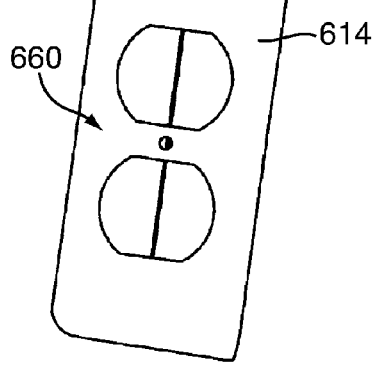
Figure 30H:
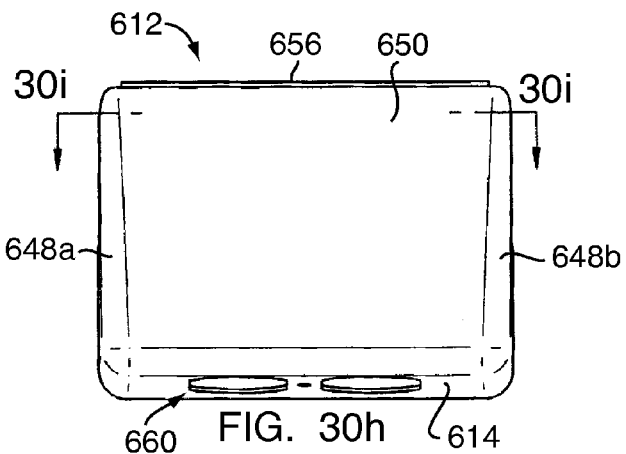
Figure 30I:
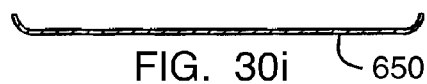

The faceplate portion 614 is provided with features for accessing the finished or exposed portions of the access face 644 of the outlet device 606. As shown in FIGS. 30a and 30f, for example, the faceplate 614 may include a standard aperture pattern 660 that corresponds to a standard duplex electrical outlet, e.g., two primary apertures for the outlets, and a center hole for a fastener. In other words, the faceplate 614 mimics a standard finishing plate for the type of electrical device 606 to be utilized with the assembly 600. Although a duplex outlet configuration is shown in the figures, the faceplate 614 could be provided with numerous different configurations for different types of electrical devices. In many cases, the faceplate 614 will be generally aligned and coextensive with the access face of the electrical device, meaning that the outlet access face is approximately flush with the faceplate and matches the faceplate aperture pattern 660, for providing a finished appearance.

For installing the assembly 600, with reference to FIGS. 28a and 28b, it is assumed that a raceway 602 is attached to a wall surface 608, as indicated. The raceway 602 is typically of the type having a generally rectangular cross section, including those with rounded or oval configurations. If the raceway has a front cover, a portion of front cover is removed, which is slightly smaller in width than the width of the bracket 610. (Alternatively, the bracket can be positioned between the ends of two adjacent sections of raceway cover.) This exposes the interior of the raceway, for accessing the electrical cable housed in the raceway. Then, one or more of the bracket knock-outs 628 are removed, depending on which area of the raceway interior is to be accessed. As should be appreciated, for those knock-outs 628 that are not removed, that portion of the raceway remains covered by the bracket 610. Next, an outlet device 606 is attached to the bracket's device support (e.g., the connection flanges 618a, 618b), using standard fasteners, including both mechanical and electrical connections. Then, the exposed raceway cable is electrically and mechanically connected to the outlet in a standard manner, and the bracket 610 is moved into place as shown in FIGS. 28a and 28b. Finally, the bracket 610 is attached to the wall 608 by driving fasteners through the apertures 626. (Depending on the particular outlet, raceway, electrical connections, etc., the aforementioned steps may be performed in a different order.) Finally, the cover 612 is angled into position over the bracket 610, with the lip 630 and flange 656 engaging and the faceplate portion 614 aligning with the outlet device 606. A finishing fastener (not shown) is typically driven through the central opening of the aperture pattern 660, for connecting the cover 612 to the outlet device 606.

Although the device connection flanges 618a, 618b have been illustrated as being connected to the bottom or wall-mount plate 620, they could alternatively be connected to the upper, raceway access plate 624 without departing from the spirit and scope of the invention. For example, the side extenders 632 could extend out and down from the side edges of the upper plate 624, with the tabs remaining oriented as generally shown in the figures.

Although the assembly 600 has been illustrated as including a bracket 610, the functions of the bracket could instead be incorporated into the cover 612 and/or the raceway 602. Here, for example, connection flanges (such as the connection flanges 618a, 618b shown in the figures) could be connected to the inside wall of the cover 612 at appropriate locations, e.g., on the interior of the sidewalls 648a, 648b. The upper portion of the cover (e.g., the portion that abuts the raceway access plate 624) would include a member for covering the raceway interior, possibly with knock-out type features. The cover would also include attachment means, e.g., tabs, apertures, or the like, for connecting the cover to the wall 608 after electrically connecting the outlet or other electrical device 606 to the raceway cabling. As should be appreciated, the electrical device 606 could be pre-installed into the cover 612. If the functionality of the bracket 610 was instead fully or partially incorporated into the raceway 602, then connection flanges could be attached to the raceway base at appropriate locations. Similar configurations are possible.

Since certain changes may be made in the above-described downward facing receptacle assembly for cable raceway, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A cable raceway system comprising:
an elongate cable raceway having at least one interior wireway and a rear surface for mounting the raceway to a wall;
a device bracket cooperative with the raceway for access to said at least one wireway, said bracket having a device support for connection of an electrical device to the bracket, wherein the device support is configured for an access face of the electrical device to be oriented generally perpendicularly with respect to the raceway rear surface when the electrical device is connected to the device support; and
a device cover cooperative with the bracket and raceway for covering the bracket, said cover having a faceplate portion complementary to the electrical device.

2. The cable raceway system of claim 1 wherein the device support is configured for the access face of the electrical device to be oriented at an angle with respect to the raceway rear surface when the electrical device is connected to the device support, said angle being less than about 95° and greater than about 75°.

3. A cable raceway system comprising:
an elongate cable raceway having an interior wireway;
a device bracket cooperative with the raceway for access to the wireway, wherein the device bracket is configured for an access face of an electrical device attached thereto to be oriented downwards with respect to the raceway when the electrical device is connected to the device bracket and the raceway is mounted horizontally to a wall; and
a device cover cooperative with the bracket and raceway for covering the bracket, said cover having a faceplate portion complementary to the electrical device.

4. A cable raceway system comprising:
an elongate cable raceway having at least one interior wireway and a rear surface for mounting the raceway to a wall surface; and
a device cover configured to be removably received on the raceway for access to said at least one interior wireway, said device cover having a faceplate portion;
wherein the faceplate portion is configured so that when an electrical device is disposed in a device opening defined by the faceplate portion, an access face of the electrical device is oriented downwards when the raceway is mounted horizontally on the wall surface.

5. The cable raceway system of claim 4 further comprising:
a device support attached to the cover for connection of the electrical device to the cover, wherein the device support is configured for the access face of the electrical device to be oriented generally perpendicularly with respect to the wall surface when the electrical device is connected to the device support.

6. The cable raceway system of claim 4 further comprising:
a device bracket cooperative with the raceway for selective access to said at least one wireway, said bracket having a device support for connection of the electrical device to the bracket, wherein the device support is configured for the access face of the electrical device to be oriented generally perpendicularly with respect to the wall surface when the electrical device is connected to the device support;
wherein the device cover is cooperative with the bracket and raceway for covering the bracket.

7. A cable raceway system for routing cabling to an electrical device, the cable raceway system comprising:
an elongate cable raceway having at least one interior wireway extending therethrough and a rear surface for mounting the raceway to a wall surface; and
a device cover configured to be removably received on the raceway for access to said at least one interior wireway, said device cover having a faceplate portion with at least one device opening complementary to the electrical device;
wherein the device cover is configured so that when received on the raceway, the device opening of the faceplate portion is oriented downwards when the raceway is mounted horizontally on the wall surface.

8. The cable raceway system of claim 7 wherein the device cover is configured for the faceplate portion to be oriented at an angle with respect to the raceway rear surface when the device cover is connected to the raceway, said angle being less than about 95° and greater than about 75°.

9. The cable raceway system of claim 7 wherein the device cover is removably received on the raceway through a snap connection.

10. The cable raceway system of claim 7 wherein the device cover includes connection flanges for attaching the electrical device thereto.

11. The cable raceway system of claim 10 wherein the electrical device is pre-installed in the device cover.

12. The cable raceway system of claim 7 wherein the device cover includes a member covering a portion of the interior wireway.

13. The cable raceway system of claim 12 wherein the member includes at least one knock-out feature.

14. A cable raceway system comprising:
an elongate cable raceway having a substantially rectangular cross section with a rear surface for mounting the raceway to a wall surface, the elongated cable raceway having at least one interior wireway extending therethrough; and
a device cover configured to be removably received on the raceway for access to said at least one interior wireway, said device cover having a faceplate portion with at least one device opening formed therein;
wherein the device cover is configured so that when received on the raceway, the faceplate portion is oriented at an angle with respect to the raceway rear surface, said angle being less than about 95° and greater than about 75°.

15. The cable raceway system of claim 14 wherein the faceplate portion is oriented below the raceway and facing downwards therefrom when the raceway is mounted horizontally on the wall surface.

16. The cable raceway system of claim 14 wherein the device cover is removably received on the raceway through a snap connection.

17. The cable raceway system of claim 14 wherein the device cover includes connection flanges for attaching an electrical device thereto.

18. The cable raceway system of claim 17 wherein the electrical device is pre-installed in the device cover.

19. The cable raceway system of claim 14 wherein the device cover includes a member covering a portion of the interior wireway.

20. The cable raceway system of claim 19 wherein the member includes at least one knock-out feature.

* * * * *